United States Patent
Basting et al.

(10) Patent No.: US 7,308,013 B2
(45) Date of Patent: Dec. 11, 2007

(54) EXCIMER OR MOLECULAR FLUORINE LASER SYSTEM WITH PRECISION TIMING

(75) Inventors: Dirk Basting, Fort Lauderdale, FL (US); Sergei Govorkov, Boca Raton, FL (US); Rainer Paetzel, Dransfeld (DE); Igor Bragin, Goettingen (DE); Andreas Targsdorf, Gardelegen (DE)

(73) Assignee: Lambda Physik AG, Goettingen (DE)

( * ) Notice: Subject to any disclaimer, the term of this patent is extended or adjusted under 35 U.S.C. 154(b) by 381 days.

(21) Appl. No.: 10/699,763

(22) Filed: Nov. 3, 2003

(65) Prior Publication Data

US 2005/0031004 A1    Feb. 10, 2005

Related U.S. Application Data

(60) Provisional application No. 60/452,719, filed on Mar. 6, 2003, provisional application No. 60/434,102, filed on Dec. 16, 2002, provisional application No. 60/427,608, filed on Nov. 18, 2002, provisional application No. 60/424,244, filed on Nov. 5, 2002.

(51) Int. Cl.
*H01S 3/22* (2006.01)

(52) U.S. Cl. .................................... 372/57; 372/55

(58) Field of Classification Search ................ 372/57, 372/55
See application file for complete search history.

(56) References Cited

U.S. PATENT DOCUMENTS

| | | | |
|---|---|---|---|
| 4,459,541 A * | 7/1984 | Fielden et al. ............... 324/678 |
| 6,005,880 A * | 12/1999 | Basting et al. ............ 372/38.04 |
| 6,198,761 B1 | 3/2001 | Von Bergmann et al. ..... 372/86 |
| 6,226,307 B1 | 5/2001 | Desor et al. .................. 372/37 |
| 6,243,406 B1 | 6/2001 | Heist et al. ................... 372/59 |
| 6,359,922 B1 | 3/2002 | Partlo et al. .................. 372/58 |
| 6,370,174 B1 | 4/2002 | Onkels et al. ........... 372/38.04 |
| 6,381,256 B1 | 4/2002 | Stamm et al. ................. 372/19 |
| 6,381,257 B1 | 4/2002 | Ershov et al. ................ 372/57 |
| 6,549,551 B2 | 4/2003 | Ness et al. ............... 372/38.07 |
| 6,556,600 B2 | 4/2003 | Sandstrom et al. ........... 372/25 |
| 6,567,450 B2 | 5/2003 | Myers et al. .................. 372/55 |
| 6,590,922 B2 | 7/2003 | Onkels et al. ................. 372/57 |
| 6,625,191 B2 | 9/2003 | Knowles et al. .............. 372/55 |

(Continued)

OTHER PUBLICATIONS

In re patent application of Sergei V. Govorkov et al., U.S. Appl. No. 10/806,847, filed Mar. 23, 2004, entitled Method and Apparatus for Measuring Amplified Stimulated Emission in the Output of A Master Oscillator Power Amplifier System, 37 pages.

(Continued)

*Primary Examiner*—Dung Nguyen
(74) *Attorney, Agent, or Firm*—Stallman & Pollock LLP

(57) ABSTRACT

A Master Oscillator (MO)—Power Amplifier (PA) configuration (MOPA) can be used advantageously in an excimer laser system for micro-lithography applications, where semiconductor manufacturers demand powers of 40 W or more in order to support the throughput requirements of advanced lithography scanner systems. The timing of discharges in discharge chambers of the MO and PA can be precisely controlled using a common pulser to drive the respective chambers. The timing of the discharges further can be controlled through the timing of the pre-ionization in the chambers, or through control of the reset current in the final compression stages of the pulser. A common pulser, or separate pulser circuits, also can be actively controlled in time using a feedback loop, with precision timing being achieved through control of the pre-ionization in each individual discharge chamber. Yet another system provides for real-time compensation of time delay jitter of discharge pulses in the chambers.

13 Claims, 17 Drawing Sheets

U.S. PATENT DOCUMENTS

| | | | |
|---|---|---|---|
| 6,690,704 B2 | 2/2004 | Fallon et al. | 372/58 |
| 6,693,939 B2 | 2/2004 | Klene et al. | 372/58 |
| 6,704,339 B2 | 3/2004 | Lublin et al. | 372/57 |
| 2002/0031160 A1* | 3/2002 | Desor | 372/57 |
| 2002/0044586 A1 | 4/2002 | Myers et al. | 372/57 |
| 2002/0064202 A1 | 5/2002 | Sandstrom et al. | 372/55 |
| 2002/0071468 A1 | 6/2002 | Sandstrom et al. | 372/57 |
| 2002/0085606 A1 | 7/2002 | Nes et al. | 372/55 |
| 2002/0114370 A1 | 8/2002 | Onkels et al. | 372/55 |
| 2002/0154668 A1 | 10/2002 | Knowles et al. | 372/55 |
| 2002/0154671 A1 | 10/2002 | Knowles et al. | 372/57 |
| 2002/0186739 A1 | 12/2002 | Sandstrom et al. | 372/55 |
| 2002/0191654 A1 | 12/2002 | Klene et al. | 372/25 |
| 2003/0012234 A1 | 1/2003 | Watson et al. | 372/25 |
| 2003/0031216 A1 | 2/2003 | Fallon et al. | 372/29.01 |
| 2003/0043876 A1 | 3/2003 | Lublin et al. | 372/55 |
| 2003/0091087 A1 | 5/2003 | Ershov et al. | 372/55 |
| 2003/0099269 A1 | 5/2003 | Ershov et al. | 372/55 |
| 2003/0138019 A1 | 7/2003 | Rylov et al. | 372/58 |
| 2003/0219094 A1 | 11/2003 | Basting et al. | 378/34 |
| 2004/0022291 A1 | 2/2004 | Das et al. | 372/55 |
| 2004/0022293 A1 | 2/2004 | Rule et al. | 372/58 |
| 2004/0047385 A1 | 3/2004 | Knowles et al. | 372/55 |
| 2004/0057489 A1 | 3/2004 | Fallon et al. | 372/57 |
| 2006/0239307 A1* | 10/2006 | Nakao et al. | 372/29.011 |

OTHER PUBLICATIONS

In re application of Hubertus von Bergmann et al., U.S. Appl. No. 10/713,583, filed Nov. 14, 2003, entitled Reduced-Maintenance Excimer-Laser with Oil-Free Solid State Pulser, 36 pages.

In re patent application of Sergei Govorkov et al., U.S. Appl. No. 10/776,137, filed Feb. 11, 2004, entitled Excimer or Molecular Fluorine Laser with Several Discharge Chambers, 43 pages.

In re patent application of Sergei Govorkov et al., U.S. Appl. No. 10/776,404, filed Feb. 11, 2004, entitled Master Oscillator/Power Amplifier Excimer Laser System with Pulse Energy and Pointing Control, 39 pages.

In re patent application of Sergei V. Govorkov et al., U.S. Appl. No. 10/847,071, filed May 17, 2004, entitled MOPA Excimer or Molecular Fluorine Laser System with Improved Synchronization, 54 pages.

D. Basting et al., "Thyratrons with Magnetic Switches: The Key to Reliable Excimer Lasers," *Laser und Optoelektronik*, No. 2, 1984, 4 pages 128-131.

* cited by examiner

- prior art -

EXCIMER OR MOLECULAR FLUORINE LASER SYSTEM WITH PRECISION TIMING

CLAIM OF PRIORITY

This patent application claims priority to U.S. provisional patent applications "A REAL-TIME ELECTRONIC CIRCUIT FOR COMPENSATING TIME DELAY JITTER IN AN EXCIMER MOPA SYSTEM," No. 60/424,244, filed Nov. 5, 2002; "A REAL-TIME ELECTRONIC CIRCUIT FOR COMPENSATING TIME DELAY JITTER IN AN EXCIMER MOPA SYSTEM," No. 60/427,608, filed Nov. 18, 2002; "A REAL-TIME ELECTRONIC CIRCUIT FOR COMPENSATING TIME DELAY JITTER IN AN EXCIMER MOPA SYSTEM," No. 60/434,102, filed Dec. 16, 2002; and "EXCIMER OR MOLECULAR FLUORINE LASER SYSTEM WITH PRECISION TIMING," No. 60/452,719, filed Mar. 6, 2003; all of which are incorporated herein by reference.

CROSS-REFERENCE TO RELATED APPLICATIONS

The following applications are cross-referenced and hereby incorporated herein by reference:

U.S. Patent application Ser. No. 10/696,979 entitled "MASTER OSCILLATOR—POWER AMPLIFIER EXCIMER LASER SYSTEM," to Gongxue Hua et al., filed Oct. 30, 2003;

U.S. Pat. No. 6,226,307, entitled "MAGNETIC SWITCH CONTROLLED POWER SUPPLY ISOLATOR AND THYRISTOR COMMUTATING CIRCUIT," to Rainer Desor et al., Nov. 2, 1999; and U.S. Pat. No. 6,005,880, entitled "PRECISION VARIABLE DELAY USING SATURABLE INDUCTORS," to Dirk Basting et al., filed Mar. 21, 1997.

TECHNICAL FIELD OF THE INVENTION

The present invention relates to synchronization and time delays in high power excimer or molecular fluorine lasers, such as are useful for applications in microlithography and semiconductor processing.

BACKGROUND

Semiconductor manufacturers are currently using deep ultraviolet (DUV) lithography tools based on KrF-excimer laser systems, operating at wavelengths around 248 nm, as well as ArF-excimer laser systems, which operate at around 193 nm. Vacuum UV (VUV) tools are based on $F_2$-laser systems operating at around 157 nm. These relatively short wavelengths are advantageous for photolithography applications because the critical dimension, which represents the smallest resolvable feature size that can be produced photolithographically, is proportional to the wavelength used to produce that feature. The use of smaller wavelengths can provide for the manufacture of smaller and faster microprocessors, as well as larger capacity DRAMs, in a smaller package. In addition to having smaller wavelengths, such lasers have a relatively high photon energy (i.e., 7.9 eV) which is readily absorbed by high band gap materials such as quartz, synthetic quartz ($SiO_2$), Teflon (PTFE), and silicone, among others. This absorption leads to excimer and molecular fluorine lasers having even greater potential in a wide variety of materials processing applications. Excimer and molecular fluorine lasers having higher energy, stability, and efficiency are being developed as lithographic exposure tools for producing very small structures as chip manufacturing proceeds into the 0.18 micron regime and beyond. The desire for such submicron features comes with a price, however, as there is a need for improved processing equipment capable of consistently and reliably generating such features. Further, as excimer laser systems are the next generation to be used for micro-lithography applications, the demand of semiconductor manufacturers for powers of 40 W or more to support throughput requirements leads to further complexity and expense.

DETAILED DESCRIPTION

Figure 1:
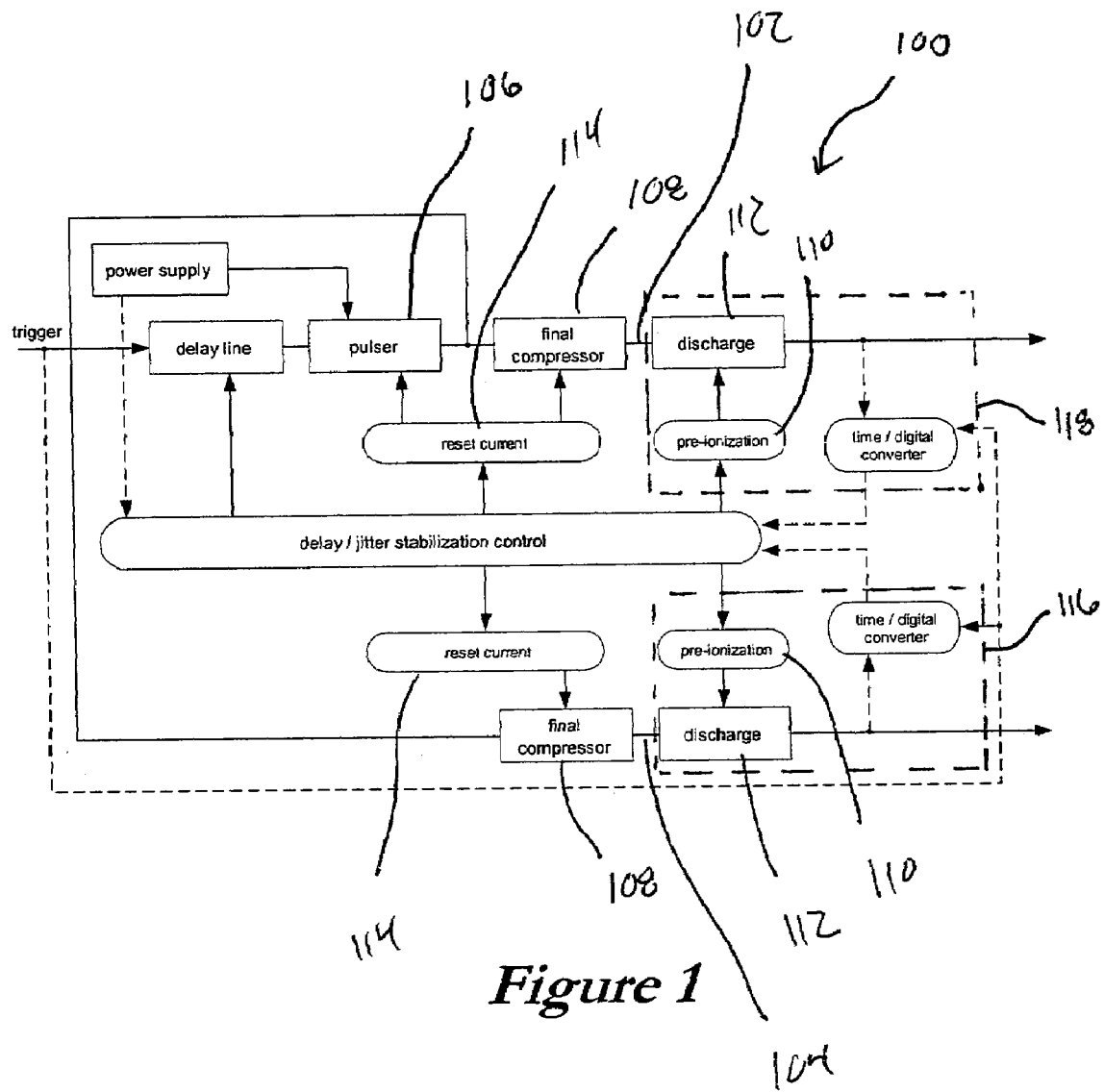
FIG. 1 is a diagram showing a double chamber laser system that can be used in accordance with one embodiment of the present invention.

As semiconductor manufacturers move toward the production of chips with smaller sizes, the requirements on the processing and manufacturing equipment, including the laser light sources, are ever increasing. In laser systems used for photolithography applications, for example, it would be desirable to move toward higher repetition rates, increased energy stability and dose control, increased system uptime, narrower output emission bandwidths, improved wavelength and bandwidth accuracy, and improved compatibility with stepper/scanner imaging systems. It also would be desirable to provide lithography light sources that deliver high spectral purity and extreme power, but that also deliver a low cost chip production. Requirements of semiconductor manufacturers for higher power and tighter bandwidth can place excessive and often competing demands on current single-chamber-based light sources. Many of these obstacles can be overcome by taking advantage of a dual-gas-discharge-chamber technology, referred to herein as MOPA (Master Oscillator—Power Amplifier) technology. MOPA technology is discussed further in U.S. Patent Application Ser. No. 10/696,979 entitled "MASTER OSCILLATOR—POWER AMPLIFIER EXCIMER LASER SYSTEM," which is incorporated herein by reference above. MOPA technology can be used to separate the bandwidth and power generators of a laser system, as well as to separately control each gas discharge chamber, such that both the required bandwidth and pulse energy parameters can be optimized. Using a master oscillator (MO), for example, an extremely tight spectrum can be generated for high-numerical-aperture lenses at low pulse energy. A power amplifier (PA), for example, can be used to intensify the light, in order to deliver the power levels necessary for the high throughput desired by the chip manufacturers. The MOPA concept can be used with any appropriate laser, such as KrF, ArF, and $F_2$-based lasers. Further, a MOPA system can utilize separate switch/pulser systems for each discharge chamber (for the MO and the PA), but the use of separate switch/pulser systems typically leads to problems with synchronization, as controlling the timing between the parallel systems can be difficult.

Systems and methods in accordance with embodiments of the present invention can overcome deficiencies in existing laser systems by providing for the precise control of the timing of two or more discharges, such as discharges in a MOPA arrangement. In one such system, a laser system can have multiple gas discharge tubes or chambers driven by a common pulser. The pulser can include several initial compression stages, but can have separate final compression stages for each chamber. Improved timing precision for the discharges can be achieved through control of the pre-ionization timing in each of the tubes, and/or by control of the reset current in at least one of the final compression stages. In another system, pulser timing can be actively controlled in real-time using a feedback loop.

FIG. 1 shows a solid state laser system 100 utilizing a common pulser 106. The pulser can be used to supply first and second discharge voltages 102, 104 to separate laser tubes or discharge chambers 112. The discharge voltages are supplied using separated channels, with each channel containing a separate final compressor component 108. Such a solid state laser system can include several compressor stages, such as on the order of five compressor stages. A number of initial compressor stages, such as 3, can be combined in the common pulser component 106. The remaining compressor stages, namely 2 in this instance, including the final compressor stage 108, can be maintained separately for each channel of the system. The majority of jitter between channels in the system, such as on the order or 90% of the jitter, can occur in the first several compressor stages for each channel. Using a common pulser circuit allows these first several stages to be combined into a single set of compressor stages, eliminating the jitter between channels that would otherwise result from separate stages for separate channels. It still can be necessary to separate at least the final compressor stages for each channel, if not the last few stages for each channel, in order to decouple the discharges and/or isolate the discharge chambers 112 from one another.

Figure 2:
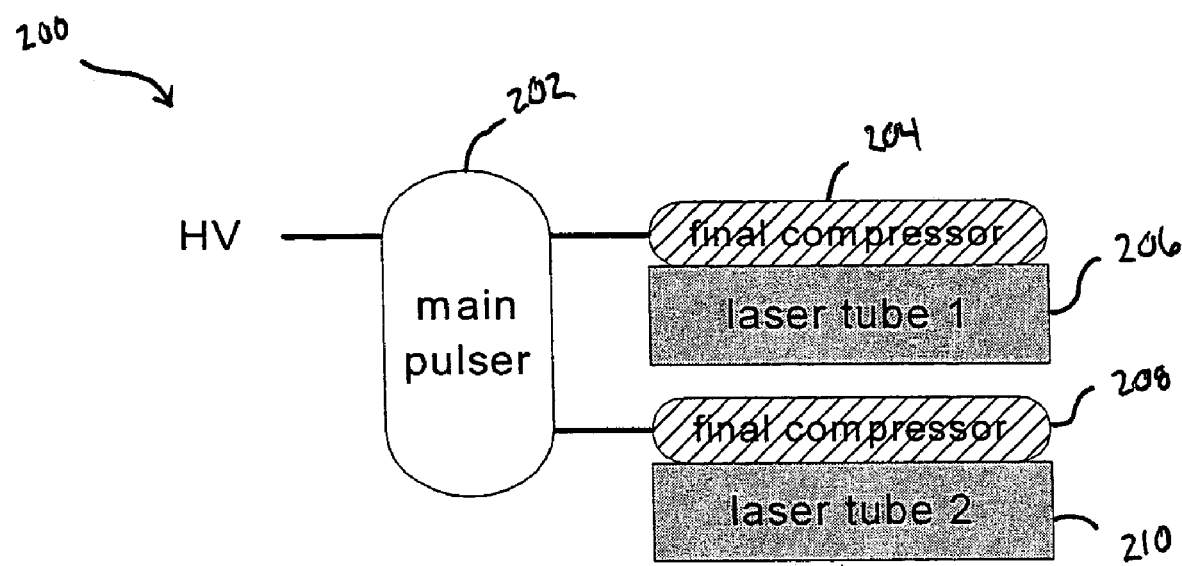
FIG. 2 is a diagram showing a configuration for a pulser module and discharge chambers that can be used with the system of FIG. 1.

FIG. 2 is a block diagram of an exemplary configuration 200 similar to that described with respect to FIG. 1, containing a common pulser module 202. As can be seen, the discharge chambers for the two channels, shown by laser tubes 1 and 2 (206, 208), are in close proximity to the respective final compressor stages 204, 208. The main pulser component 202 can contain any appropriate components, such as may include a storage capacitor, a switch, a transformer, and one or more capacitor/inductor compression stages. As discussed above, it can be advantageous for jitter reduction to include at least one initial compression stage in the common pulser component, while leaving at least one final compression stage outside the common pulser for each channel in order to decouple the laser tubes 206, 210. The final compressor stages 204 and 208 for each gas discharge unit can each include one or more compression stages. As discussed below with respect to FIG. 4, a final compressor stage can include any appropriate components, such as inductors (L2 and L3) and at least one capacitor (C3).

The discharge chambers for such a system can be in a MOPA configuration, utilizing a separated master oscillator and power amplifier. A high voltage level can be related to the trigger delay, due to a hold-off time in the pulser. The hold-off time can be determined by a magnetic assist component and magnetic pulse compression stages of the pulser. A higher operating voltage can lead to a shorter delay due to the existence of a shorter hold-off time. The delay can change by few nanoseconds per volt, and can be described by a formula such as the following:

$$\text{delay} \approx a^* HV + t_0$$

Such variations of the high voltage on a pulse-to-pulse basis can be required in a typical lithography excimer laser in order to control the output pulse energy. Such a requirement can inevitably cause variations in the delay time.

An advantage to using a common pulser is that the correction of the delay for the actual voltage need only meet the relaxed requirement of the application for the total trigger-to-light delay, which can be on the order of 100 ns, whereas the relative timing precision between the chambers in the laser can be better than 1 ns. For example, referring to FIG. 4, the timing between the issuance of a trigger pulse to the emission of light from the system can be on the order of 100 ns, but the variation in timing discharges in the master oscillator 426 and power amplifier 432 must be on the order of 1 ns. The relative timing of the discharges in the MO and PA can be much more critical than the timing between the issuance of a trigger pulse and the emission of light. The photodiode 422 can be used to detect the discharge of the master oscillator. A photodiode may not be appropriate for the power amplifier 432, and the power amplifier can detect the arrival of the light pulse instead of the discharge of the amplifier. As such, an electronic detector 424 can be used to detect the discharge of the power amplifier 432. The timing of the MO and PA can then be fed into the microprocessor, such that the microprocessor can make adjustments for variations in the delay between the chambers, and/or the delay between the trigger pulse and the final light emission.

In a common pulser circuit such as that of FIG. 1, the same voltage can be used and transferred to laser discharge chambers for each of two channels, such that the difference in trigger-to-pulse delays between the two discharges can be controlled with high precision. Moreover, since one or more of the compressor stages are common to both channels, the uncontrolled difference can be further reduced. Final compressor stages 108 can be used to control a delay difference, but can operate on a faster time scale than the initial stages. Other parameters can affect the delay, such as the temperature of the various elements in the pulser circuit. A change in temperature can manifest itself in a slow drift of the delay. Analysis of the trigger to light delay, delay drifts, and jitter behavior can show a variety of parameters which influence the resulting light pulse.

While stabilization of the average temperature can be straightforward, localized heating effects in critical components can still be significant. These effects can be separated into effects occurring on a pulse-to-pulse basis, and effects requiring a much slower time scale, such as on the order of seconds or even minutes. Additionally, the main delay changes can happen in the pulser, such that only a small variation of the delay remains in the laser chamber. The use of a common pulser can eliminate a majority of the delay variation, and can minimize the difference between the delays of each channel.

Figure 3:
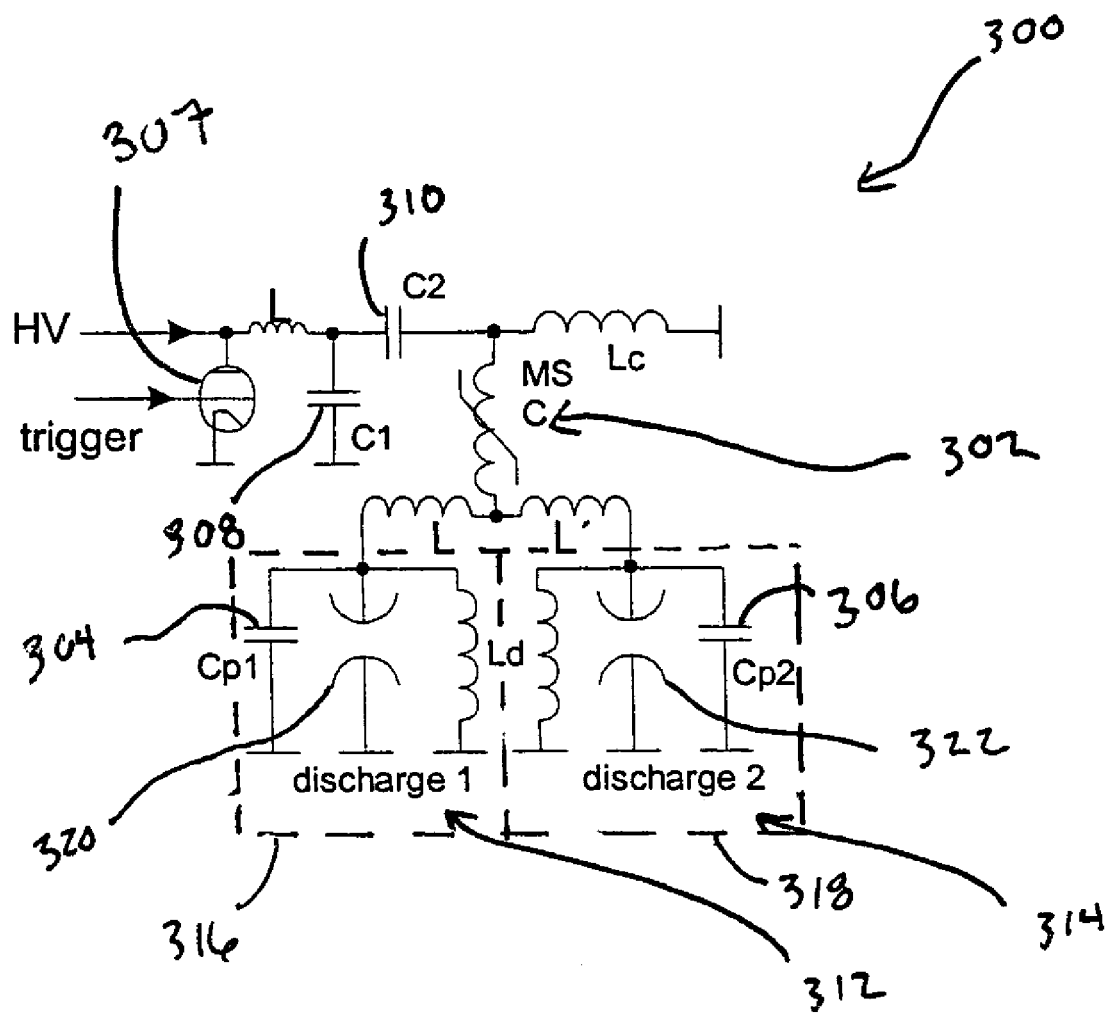
FIG. 3 is a circuit diagram showing a double discharge with common switch and common pulse compressor of the prior art.

Some existing systems utilize a common source of energy for separate channels. For example, FIG. 3 shows an injection locked, double discharge laser 300 of the prior art. This laser utilizes a common single switch arrangement, where the switch can be a thyratron 307, and in conjunction with the thyratron a magnetic switch control (MSC) 302 can be used to further control the pulse width. Following the MSC the electrical pulse from the MSC is input to different discharge circuits 316, 318, wherein a peaking capacitor 304 is discharged across electrodes 320 in a first discharge circuit 316, and a peaking capacitor 306 is discharged across electrodes 322 in a second discharge circuit 318. The MSC can be, for example, a saturable magnetic coil. The discharge capacitors 304, 306 can be charged by a current pulse supplied by the storage capacitor 308. This current first flows via the MSC, and the inductance of the MSC decreases until energy is released to the discharge capacitors 304, 306 and finally to the discharges 312, 314 in the form of a relatively short pulse with high amplitude.

The approach shown in the system of FIG. 3 suffers from reliability problems due to the relatively short lifetime of some of the componets. To a large extent the pulse electrical pulse width applied to the discharge chambers of FIG. 3 is determined by the switching speed of the thyratron 308. A limitation of such a thyratron, however, is that a thyratron can have a very limited lifetime. The limited lifetime can significantly increase system cost and downtime, both of which are crucial for industrial applications An embodiment in accordance with the present invention overcomes this deficiency by utilizing a solid state switch, such as an IGBT, to cause the discharge of voltage stored on a capacitor. A solid state switch is very reliable, but can be too slow for excimer-type applications. In order to compensate for the longer switching time, pulse compression stages can be used. The pulse compression stages of a common pusler in such an embodiment can determine the pulse width of the electrical pulse which is applied to the final compression stages.

Figure 4:
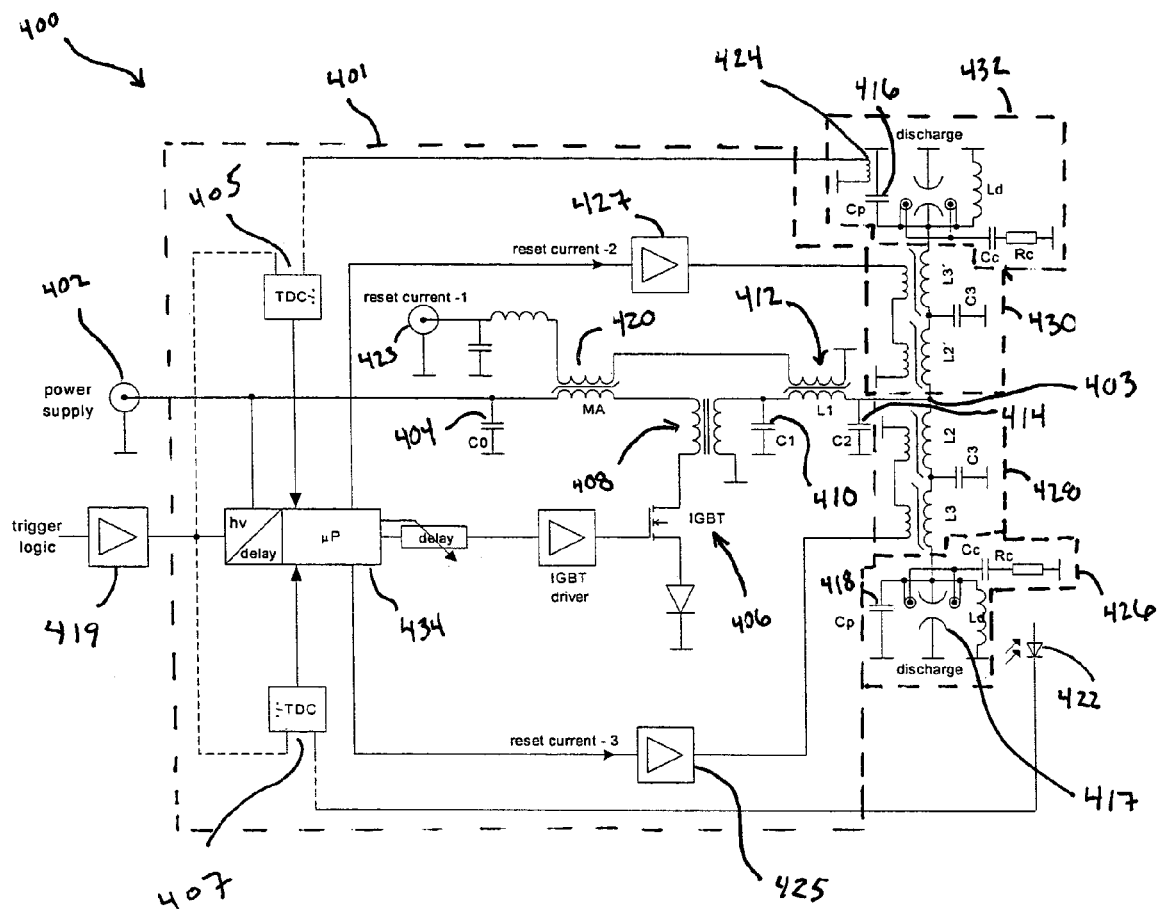
FIG. 4 is a circuit diagram for a gas discharge laser with a common solid state pulser circuit in accordance with one embodiment of the present invention.

FIG. 4 shows a schematic of a laser system 400 in accordance with one embodiment. The laser system will be described generally in terms of a MOPA system, which is a master oscillator power amplifier system, but much of the discussion in connection with system 400 would be applicable for any laser system where multiple discharge chambers are used. As shown in the embodiment of FIG. 4, a common pulser 401 is utilized. The common pulser 401 receives a high voltage from a power supply 402. Power supply 402 can be constructed from one or more power supplies connected in parallel, such as in a "master-slave" configuration, which can provide the voltage and charge for the laser pulse within the required time, such as between the consecutive pulses. Such a power supply can be obtained by Lambda EMI, where model LC203 has been tested in pulsed operation up to 6 kHz. The storage capacitor 404 of the common pulser can hold the charge until a trigger pulse is received and the IGBT (Insulated gate, bi-polar transistor) 406 switches the stored energy into a primary winding of transformer 408. A magnetic assist inductor 420 can be used in a primary loop of the transformer to control current risetime.

The signal can be transformed with suitable step-up ratio of about 20, for example, and can charge capacitor 410. A saturable inductor 412 can hold off this voltage, preventing charging of capacitor 414 until a hold-off time is reached, whereby a compressed current pulse charges 414. In this manner, these components form a pulse compression stage in the common pulser 401. Depending on the specific design requirements, additional pulse compression stages can be added to further modify the electrical pulse output by the common pulser. The electrical pulse from the common pulser 401 is input at node 403 into two final compression stages 428 and 430. As discussed with respect to the common pulser, each of final compression stages 428 and 430 can utilize additional pulse compression stages to further modify the eletrical pulse input to the MO and/or PA. Final compression stage 428 outputs an electrical pulse to a gas discharge unit 426. In a MOPA system the gas discharge unit 426 would be the master oscillator component. Final compression stage 430 outputs an electrical pulse to gas discharge unit 432. In a MOPA system discharge unit 432 would correspond to a power amplifier. During the transfer of the pulse through the final compression stages, each pulse can be further compressed to show a fast risetime of about 50 ns on the respective peaking capacitors 416, 418.

In operation the master oscillator can generate a relatively lower power output beam as a result of electrical charge stored on the peaking capacitor 418 being discharged through the electrodes 417 of gas discharge unit 426. This beam can then be transmitted to the gas discharge unit 432 of the power amplifier, wherein the energy of the beam output by the master oscillator can be amplified. The gas discharge unit 432 receives an electrical pulse from final compression stage 430.

In operation it is desirable to be able to precisely control the timing of the electrical pulses being discharged in each of gas discharge units 426 and 432. FIG. 4 shows elements that can be used to control this timing. This exemplary system operates such that a trigger signal generator 419 applies a trigger signal to the processor 434 of the system. Depending on the voltage stored on storage capacitor 404, and potentially on other factors, the 25 processor 434 can determine a delay between receiving the trigger signal from generator 419 and toggling the IGBT switch 406. In response to the closing of the IGBT switch, an electrical pulse is output through the compression stages of the common pulser 401 to final compression stages 428 and 430 at node 414. The common pulser 401 can include a reset current unit 423 which can apply a reset current to inductors or magnetic switches of the common pulser, and can thereby provide some control over the timing and shape of the electrical pulse output by the common pulser 401. The gas discharge unit 426 can further include a photodetector 418, which can generate a signal provided to TDC 407, which can indicate the time at which a discharge or light pulse occurs in discharge unit 426. It should be noted that different types of devices or circuits can be used to detect a discharge in the master oscillator, such as a pick off loop or other electrical sensor, to detect the actual discharge from peaking capacitor 418. Such a sensor can be used to detect the discharge of the peaking capacitor and/or the emission of a light pulse from the master oscillator. The TDC 407 then can determine a time difference between the discharge in the discharge unit 426 and the input of the trigger pulse from the trigger pulse unit 419. Gas discharge unit 432 also can include a device for sensing when an electrical pulse is discharged in the gas discharge unit 432. As shown, the device can be a pick up loop inductor 424 capable of sensing when the electrical pulse is discharged from peaking capacitor 416. Other electrical devices could also be used to determine when this discharge occurs, as discussed with respect to discharge unit 426. The signal from device 422 is received by a TDC 405, which can determine the difference in time between the trigger pulse and the discharge in gas discharge unit 432. Based on information from TDCs 405 and 407, the microprocessor 434 can determine a difference in time between the discharges in discharge units 426 and 432. The microprocessor 434 then can use reset current module 425 to provide reset current to inductors of final compression stage 428 to adjust the timing of the discharge in gas discharge unit 426. The microprocessor 434 can use reset current module 427 to provide reset current to inductors of final compression stage 430 to adjust the timing of the discharge in gas discharge unit 432. By controlling the reset current applied to final compression stages 428 and 430, the microprocessor 434 can precisely control a time difference in electrical pulses being applied to the gas discharge units 426 and 432. In typical operation it can be desirable to provide a very short delay between the discharge of a master oscillator and power amplifier.

In addition to using reset current controllers 425, 427 to control the timing of pulses reaching the discharge units 426, 432, an embodiment herein also provides for controlling the timing of the preionization of gases in the discharge chambers. By controlling this preionization of the gases, the precise timing of the actual discharges between the electrodes of each chamber can be further controlled. Aspects of controlling the timing of preionization will be discussed in more detail below.

In one exemplary approach, the main sources of delay jitter and drift between the two discharges are virtually eliminated by using common and/or similar circuitry where possible. The final compressors for the channels can be as identical as possible, in order to avoid delay jitter. Such an approach can also compensate for the remaining relative jitter and delay changes coming from the final compressor and chamber itself. Also, the relative delay can be adjusted as necessary to compensate for optical pulse propagation and evolution delays.

Reset Current

Figure 8:
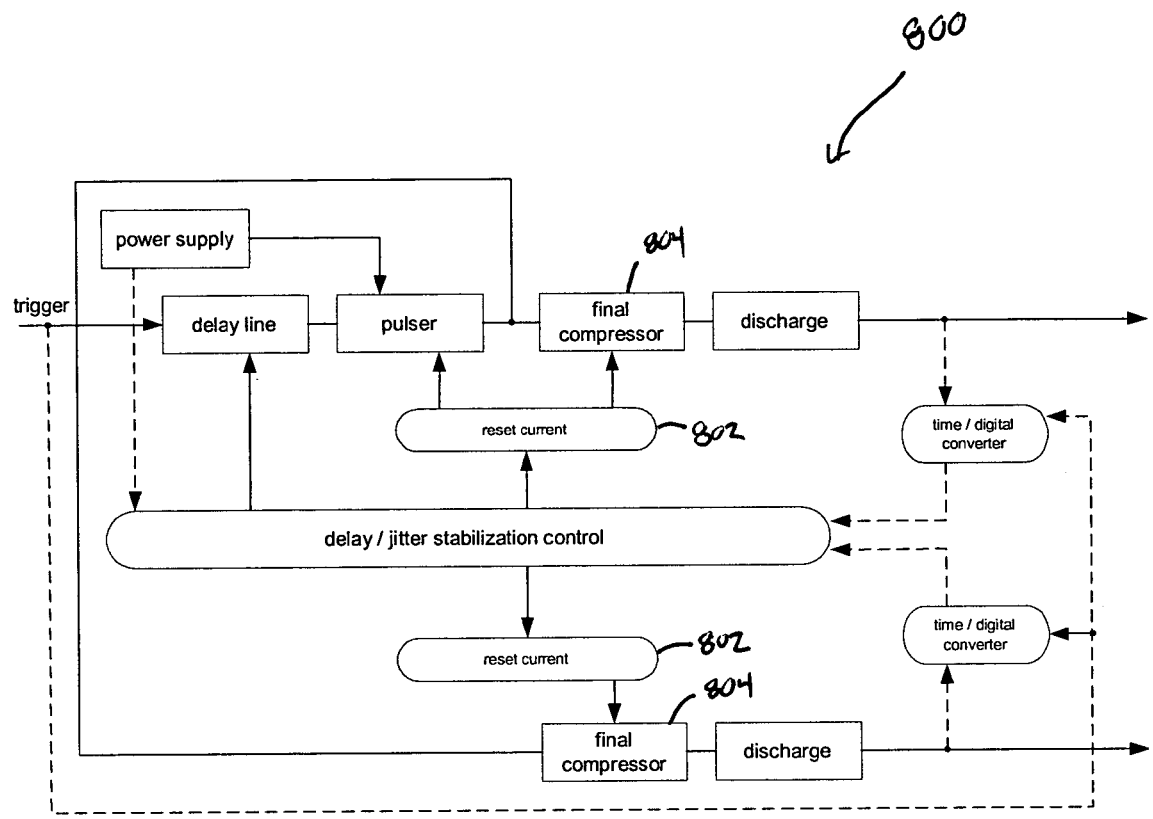
FIG. 8 is a diagram showing a double chamber laser system with a common power supply and common pulser reset current utilized for precision timing in accordance with one embodiment of the present invention.

As discussed above with respect to FIG. 4, the reset current applied to each channel can be used to provide accurate subnanosecond timing control between the voltage outputs for each channel, as driven by a common pulser. The basic approach to introducing variable timing delays between branches or channels of a circuit is described in U.S. Pat. No. 6,005,880, entitled "PRECISION VARIABLE DELAY USING SATURABLE INDUCTORS," incorporated herein by reference above. Using such an approach with a common pulser system as shown in FIG. 8, a reset current component 802 for each channel can apply a separate reset current to each final compressor stage 804, which can function as a tuning component for the main discharge pulse of each channel. The reset current applied can be determined using a computer or processing component in combination with a mechanism for monitoring the timing of the discharges. As can be seen in FIG. 8, contrasted with the system of FIG. 1, it is not necessary to have a separate pre-ionization control for each channel when taking such an approach to the reset current.

Figure 5:
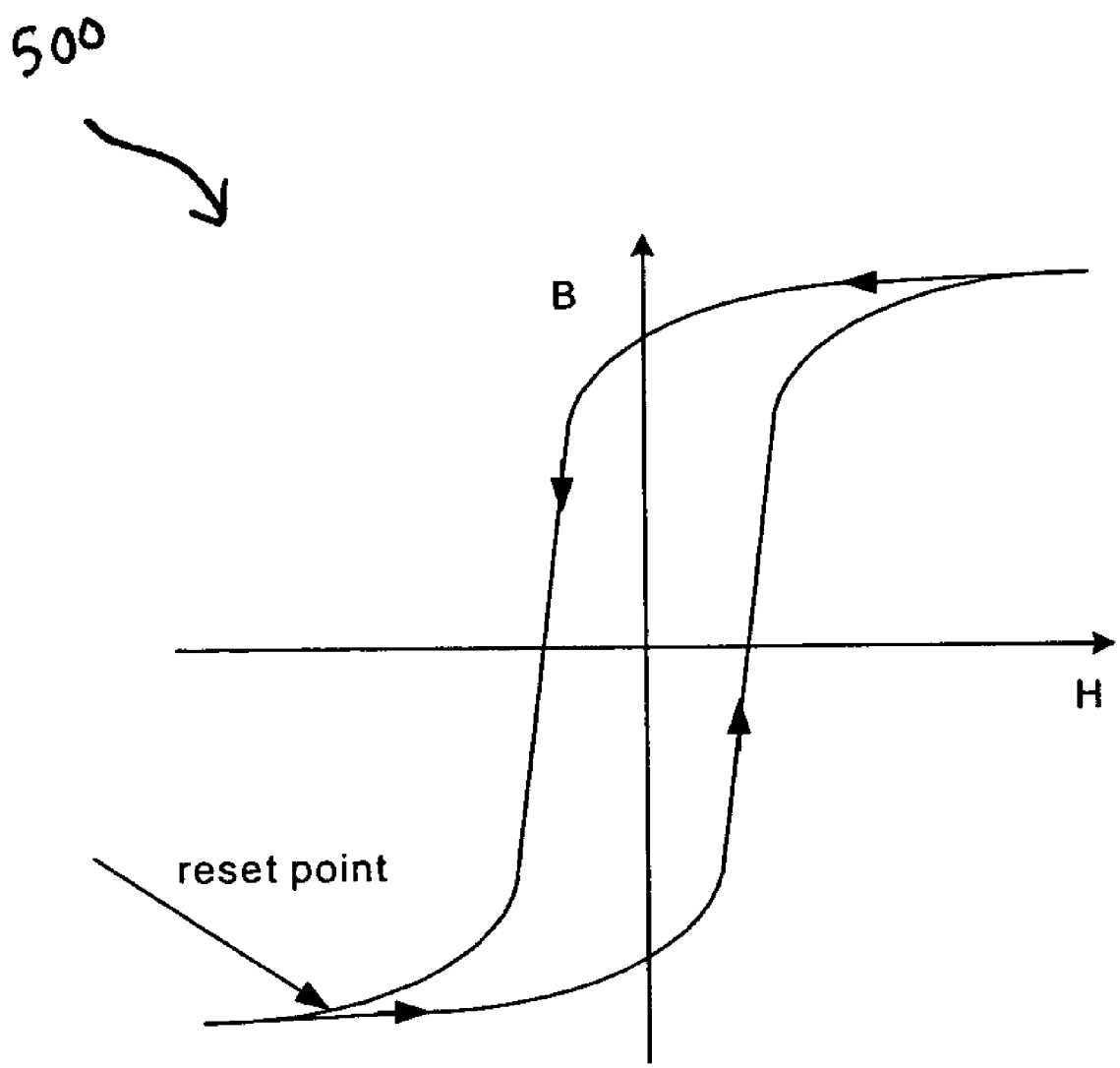
FIG. 5 is a plot showing a magnetization curve for compressor core material in accordance with one embodiment of the present invention.

In a first embodiment, a reset current supplied to one or both of the final compressor stages can be used to adjust the delay of the circuit loop. Controlling the individual delay to the final compressor stage for each channel of the system can provide a control of the delay of the output pulse from each final compressor stage. FIG. 5 shows an exemplary magnetization curve 500 for the compressor core material. The reset current can be used in a solid state pulser to reset the magnetic assist and pulse compressors to a defined state of magnetization. The time integral of the voltage drop V(t) on the saturable inductor is proportional to the total flux, as given by:

$$\int V(t) dt = -S\,N\,B,$$

where B is the magnetic flux density, S is the core cross sectional area, and N is a number of turns. The saturation flux density $B_{sat}$ can be reached faster if the core is not completely reset before the pulse to $-B_{sat}$. Reasons for variation in the magnetization between pulses can include fluctuations in the reset current, variations in the time between pulses in the burst mode, and magnetization by "reflected" pulses. For each switching cycle, the core can be driven through the magnetization curve, where the pulser current drives the magnetic material into positive saturation and the reset current drives the core back to a defined point on the magnetization curve.

The exact position to which the core is reset on the magnetization curve can be a function of the reset current. With higher magnetization, the magnet will take longer to saturate, such that the forward current will encounter a longer delay. The influence of the reset current on the pulser delay has been found to be several nanoseconds per ampere of reset current. This makes feasible a modulation of the resulting pulser hold-off delay by fine adjustment of the reset current. The reset current can be used to adjust the nominal delay difference between the two discharges. A delay difference on the order of 20 ns, for example, can be desirable to allow the oscillator to build up the optical pulse that is consequently seeded into the amplifier. For a stable laser operation in certain embodiments, the difference in the delay of the two discharges is critical and must be stable within 1 ns.

The delay in each of the laser tubes or output compressors can be measured by a Time-to-Digital converter such as model TDC-GP1 produced by acam-messelectronic of Germany. FIG. 4 shows TDCs 405 and 407 which can each recieve input related to the discharge in the gas discharge chambers. With such a chip, the delay between the start signal (trigger input) and the stop signal (light pulse) can be measured with 250 ps resolution. As can be seen in FIG. 4, a photodiode 422 can be used to measure the timing of the light pulse for one channel, while a detection component or "pick-off loop" 424 can be used to determine the timing of the discharge pulse in the discharge chamber for one of the channels. For instance, a stop signal can be generated by detecting the light pulse using the photodiode 422 and converting the pulse to 5 V TTL. A start signal can be generated using a suitable pick-up coil 424 capable of converting the current pulse at the peaking capacitor 416 to a 5V TTL pulse. It can be important to measure both the start and stop signals, as there can be some drift in the delay between signals over time, such as may be due to temperature increases.

The correction needed to stabilize the nominal trigger-to-light pulse delay can be calculated using the measured delay time of both discharges. Such corrections can be derived, for example, from a Proportional/Integral/Derivative (PID) controller included with microprocessor tasks as is known in the art. The adjustment of the overall delay can alter the trigger time of the IGBT in order to control the overall delay. The measurement of the delay of both discharges can also provide information relating to the deviation of the relative delay from the targeted delay difference between the channels. In order to control the delay between discharges, a fine adjustment of the reset current can be made in one or both final compression stages. These corrections can be derived from second PID controller of the microprocessors tasks. The output signal of the microprocessor can be used to modulate the current supply, which can deliver the reset current to the final compression stages.

Pre-Ionization Control

As mentioned above with respect to FIG. 4, systems and methods in accordance with embodiments of the present invention can utilize a separate pre-ionization circuit and pre-ionization timing to control discharge timing. The use of pre-ionization to control timing can be done in addition to any modulation of the reset current as described above. For example, referring back to FIG. 1 it can be seen that there is a separate pre-ionization module 110 for the discharge chamber 112 of each channel in the laser system 100.

Figure 6:
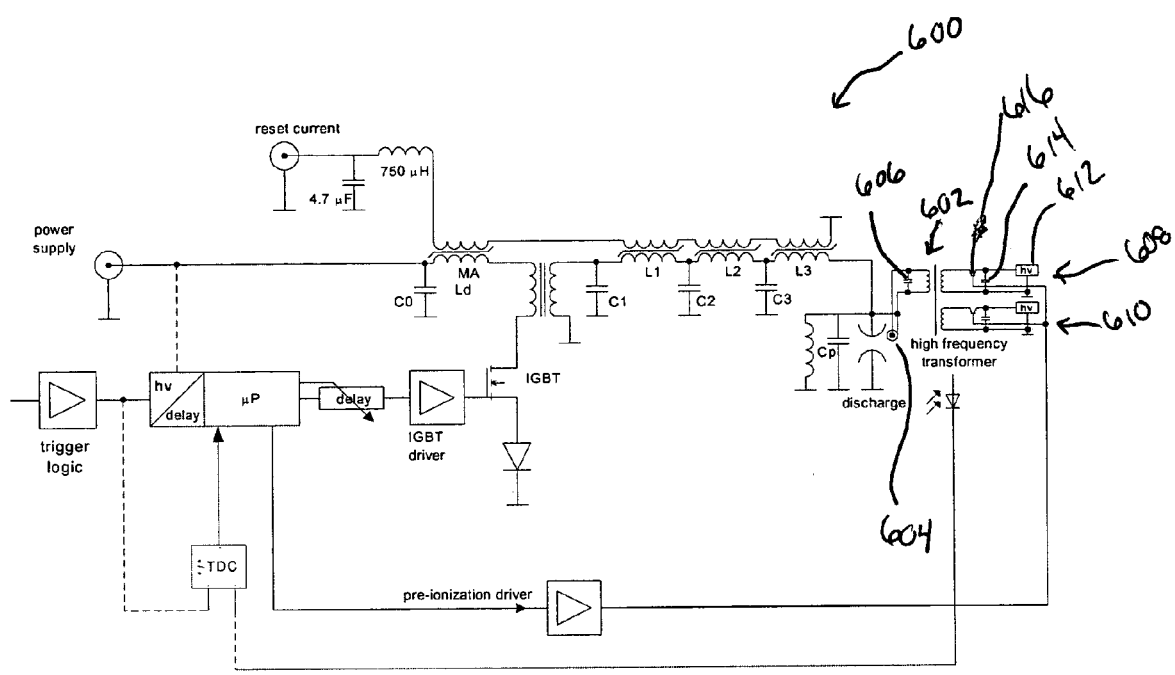
FIG. 6 is a circuit diagram for a gas discharge with solid state pulser, having an additional circuit for a separate pre-ionization in accordance with one embodiment of the present invention.

As shown in FIG. 6, each pre-ionization circuit 608, 610 can include, for example, a high voltage power supply 612, a small capacitor 614, and a switch 616. While FIG. 6 shows two such pre-ionization circuits in series with the high frequency transformer 602, it is possible to use more than two such circuits in series, or a single such circuit, in order to obtain the appropriate voltage. The switch 616 can be a low power solid state switch, which can be much faster than a high-power IGBT, and can provide a quick burst on the corona rod 604, described in more detail below. While the discharge timing of an excimer laser can be determined by the applied voltage, a high quality and uniform discharge can only occur when a suitable level of pre-ionization is present in the discharge chamber. Proper pre-ionization of the gas can produce a sufficient level of electrons, ions, and charged particles to start an avalanche gas discharge in the entire volume of a discharge gap. These separate pre-ionization modules can be controlled by a computer or processor that is part of, or in communication with, the laser system. Even though the system sends a pulse to the discharge chamber, it is necessary in such a system to receive a trigger from the ionization.

The need for sufficient preionization provides for a "fine" control over the timing of the discharges. Even if the timing differences between main pulses arriving at each chamber 112 are minimized, it is possible to further fine tune the timing by ensuring that the pre-ionization pulses for each chamber arrive substantially simultaneously. Firing a pre-ionization pulse for each chamber can ensure that the discharge from each chamber will occur with a controlled delay. So, as can be seen from FIG. 1, if the pre-ionization modules 112 fire at the appropriate time for each channel, before the arrival of the electrical or main voltage pulses 102, 104, then sufficient preionization should be realized in the discharge chambers 112 at the appropriate time, such that if the main voltage pulses arrive at a slightly different time before sufficient pre-ionization, the effective discharge of the each chamber will occur at the appropriate time due to the pre-ionization trigger. The pre-ionization can also be used to control the fixed delay necessary between chambers such as in a MOPA configuration. The fine control offered by such a pre-ionization circuit can be used in combination with, or in place of, a "rough" tuning adjustment made possible by controlling the reset current as described above.

In one exemplary approach, pre-ionization is achieved using a corona discharge component that provides sufficient pre-ionization prior to the arrival of the main voltage pulse. The result of this pre-ionization is a precise timing of the gas breakdown close to the point where the peaking capacitors are charged to a maximum voltage. In the exemplary circuit 400 of FIG. 4, the timing of the corona discharge is related to the main voltage pulse. As soon as the main voltage at the peaking capacitor CO begins rising, this same voltage appears at the corona rod. Once the voltage exceeds a few kV, the corona current can be started. The corona rod can represent a small capacity in parallel with the peaking capacitor. In this circuit 400, the pre-ionization can occur at the same time realtive, and prior, to the peak of the main voltage pulse.

Various embodiments allow the pre-ionization to be separated from the main discharge pulse, such that the timing of the pre-ionization can be controlled separately. The timing of the main discharge and light pulse can then be determined in part by the timing of the pre-ionization. The two light pulses can be timed to a higher accuracy than in existing systems, provided that the pre-ionization pulse timing is more precisely controlled than the timing of the main voltage pulse. An advantage of such an approach lies in the fact that requirements on the timing of the main discharge voltage pulse can be greatly reduced. An exemplary embodiment for one of the channels is shown in FIG. 6. The switching of the pre-ionization can require a fairly low amount of power, such as on the order of tens of Watts, such that a fast pulsed source of high voltage can be used without multiple stages of compression and the associated delay uncertainty. Such a circuit can have sufficiently low inductivity and stray capacity, however, in order to not produce displacement current through the corona rod as the voltage on the main discharge electrode rises. A circuit 600 providing for separate pre-ionization can utilize a high frequency pulse transformer 602 having sufficient isolation against the 40 kV cathode potential. Since pre-ionization can consume relatively small amounts of energy, such a circuit can be based on a fast high-voltage solid state switch, which can be virtually jitter-free. An example of such switch is a stack of FET transistors. Commercial switches of this kind are manufactured by Behlke Electronics in Germany, for example.

The typical rise time of the output voltage in these switches is less than 10 ns. The switches in each channel can be timed off the main trigger pulse. Alternatively, the trigger for one (slave) channel can be referenced to the pulse of the photodetector output produced by UV emission of another (master) chamber.

A secondary winding of the high frequency transformer 602, as shown in FIG. 6, can be connected to a capacitor 606 and the corona rod 604 in parallel. The capacitor can override the intrinsic capacitance of the corona rod and stray capacitances of the transformer and lead wires. This can prevent stray displacement current that might otherwise occur when the voltage on the cathode rises, leading to a premature corona discharge. The two primary windings of the high frequency transformer can serve to increase the peak current delivered to the corona rod. Depending on the concrete parameters of the circuit, one or more windings can be sufficient. Separate pre-ionization can be advantageously used in combination with individual or common solid state pulsers in order to create a precisely timed double discharge system, where a separate pre-ionization source is added to each channel as in FIG. 4.

Split Electrodes to Effectively Lengthen Pulse

Figure 7:
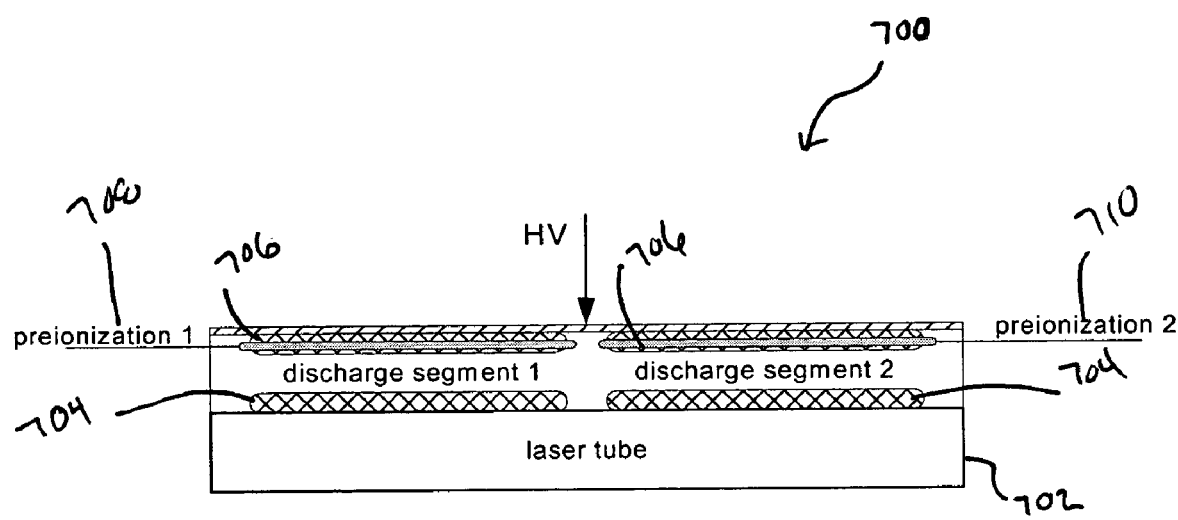
FIG. 7 is a diagram showing the use of segmented electrodes and pre-ionization in a single discharge chamber in accordance with one embodiment of the present invention.

In many applications using a double chamber excimer or molecular fluorine laser, a long pulse length is desired in order to minimize the peak power, thereby reducing the compaction of fused silica. Fused silica is currently the main material used in the lens of 193 nm microlithography scanner, and short, intense bursts can damage such a lens. It is not a matter of simply creating a longer pulse in an excimer laser system, as longer pulses tend to become unstable. Systems and methods in accordance with embodiments of the present invention can utilize an optical pulse extender to "stretch" the laser pulse. The pulse can also be extended by increasing the discharge duration in the amplifier of a MOPA system by splitting the discharge electrodes and controlling the delay between segments of the split electrodes. Multiple sets of electrodes, such as for example two pair of electrodes, or portions of the same electrode pair, can be aligned to the same optical axis. FIG. 7 shows such a configuration 700, with segmented electrodes 704, 706 and pre-ionization components 708, 710 in a single discharge chamber 702. The main discharge along these electrode segments can be performed with a selected delay and, as a result, the inversion time of the amplifier can be extended. With an appropriately long seed pulse from the oscillator, the output can be extracted over the entire period of time. In a practical arrangement, the timing difference between the two main discharges can be on the order of about 10–30 ns. A separate final compressor circuit, pre-ionization circuit, or sub-channel can be used for each electrode segment in order to generate the appropriate delays between segments. Firing the electrodes at slightly different times, using a controlled delay, can result in a longer gain pulse that has the same energy, but lower peak intensity, than a pulse created using non-segmented electrodes.

The first discharge can occur after an appropriate discharge voltage is reached and pre-ionization has occurred, in order to produce the required start-up electron and ion density for the avalanche gas discharge. The pre-ionization pulse can be applied to the second discharge with the desired delay, such as about 20 ns, which can lead to a delayed gas discharge in that section of the laser tube. The final result can be a total discharge time that is extended by approximately 20 ns. Favorable gas and voltage conditions can be maintained, such that the peaking voltage remains stable and can discharge after pre-ionization. The timing jitter of the pre-ionization pulse to the main discharge can be on the order of less than 1 ns.

Circuits described herein can be used to switch the pre-ionization of one or both of the segments with controlled delay. A low energy 193 nm light pulse can be utilized in one embodiment to produce near-perfect pre-ionization of a large cross section 193 nm discharge area. In a linear arrangement of the segmented electrodes, the UV-light pulse of the first segment can be utilized for the pre-ionization of the gas in the second segment. In such an arrangement, an automated timing of the second segment can be achieved.

Real-Time Compensation

Systems and methods in accordance with embodiments of the present invention can also utilize a circuit-allowing for real-time compensation of the time delay jitter of a discharge pulse in an excimer laser with magnetic pulse compression. Such an adjustment can be fast enough to be based on the actual parameter affecting the delay, such as the charging voltage of storage capacitor, as opposed to a slower algorithm based on delays experienced in prior pulses. The timing variation between trigger pulses can be predicted by monitoring at least one parameter of the discharge, then predicting the variation in the next pulse. Such an approach can also be used to compensate for jitter between channels when using a common pulser.

Such a circuit can add fast, real-time capability for adjusting the timing of the discharge in an excimer laser. Such timing can be important in MOPA systems, where time jitter typically has to be controlled to sub-nanosecond levels. The jitter can have multiple causes, which can be divided into "slow" and "fast" mechanisms. Slow jitter mechanisms have characteristic times that are longer than the time interval between pulses. An example of a slow mechanism is the drift due to temperature variations in the laser discharge unit. Fast jitter mechanisms can alter the delay on a time scale that is shorter than the pulse period. Examples of a fast mechanism include fluctuations of the charging voltage of the primary storage capacitor. Slow drifts can be compensated for by a feedback loop that measures the actual time delay between oscillator and amplifier discharge pulses, and which adjusts a relative delay for the next pulse. For example, a closed PID circuit can be used to measure the timing of pulses, compare the timing to at least one set point, and generate an error signal based on the difference between the timing and the set point. A computer or processor can then generate a correction for the delay line based on the error signal. While such an approach can be acceptable for slow drifts, it should be understood that such a process can be slow and can require a number of pulse measurements, such that it is not appropriate for all drifts.

For fast drifts, the parameter causing the drift, such as the voltage on the capacitor, can be measured in real time and adjusted before the pulse is triggered. The adjustment can be made using a known dependence of delay on the parameter. A fast, open loop system can be used to monitor parameters such as the high voltage, reset current, and core magnetizations of a pulse-to-pulse basis. A computer or processor can then recalculate a correction, or generate a correction, for each pulse generated. Such an approach can also be used with a common pulser system, as second order effects will exist even though a common high voltage is being used. Further, different corrections might be needed for the final compressor stage of each channel.

Therefore, while slow drifts can be compensated for by a digital circuit or microprocessor, a fast analog circuit can be added to compensate for the fast jitter of each individual pulse. While the embodiments described herein are generally drawn to jitter control techniques for MOPA systems, and particularly excimer or molecular fluorine laser systems, the principles of these techniques can also be applied to other systems as well, such as dual- or multi-discharge chamber laser systems and solid state laser MOPA systems, systems utilizing separate channels, or systems utilizing a common pulser component.

Figure 9:
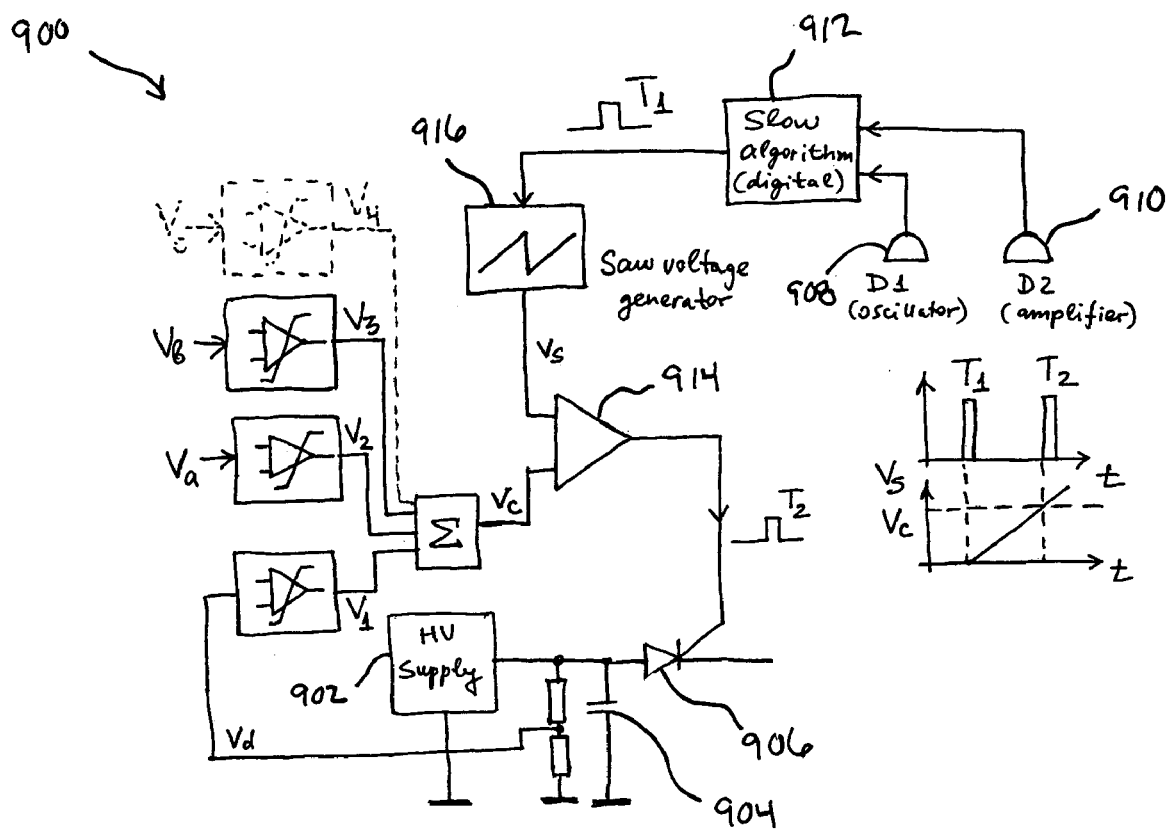
FIG. 9 is a circuit diagram for providing jitter control in accordance with one embodiment of the present invention.

FIG. 9 shows one such circuit 900 in accordance with embodiments of the present invention. In the circuit, a high voltage supply module 902 charges the storage capacitor 904. A fast switch 906 initiates discharging of the capacitor 904 into a pulse compression circuit loaded onto the discharge chamber. The optical pulses in the oscillator and amplifier chambers are detected by photodiodes 908 and 910, respectively. Information about the relative delay between optical pulses is input to a processing unit 912, which can include a microprocessor to perform a slow adjustment algorithm. In existing systems, the output of such a unit is used to trigger the switch. In this embodiment, however, a fast-acting analog circuit is added such that a delay generated by this circuit can be added to the overall delay generated by the slow digital feedback loop. The analog circuit can consist generally of several channels, one for each parameter affecting jitter. One channel can compensate for jitter caused by charging voltage instabilities, while another channel can be used to compensate for variations in reset current. The output of each channel can be a voltage that is proportional to the required delay, e.g., V1 to V4. The voltages from all such channels can be summed and input to a comparator 914. The other input of the comparator can be generated by a saw voltage generator 916, which can be synchronized to the trigger pulse from the slow control unit. As a result, the comparator 914 can output a pulse having a delay with respect to the trigger pulse that is proportional to the sum of the voltages V1 ... V4.

Figure 10:
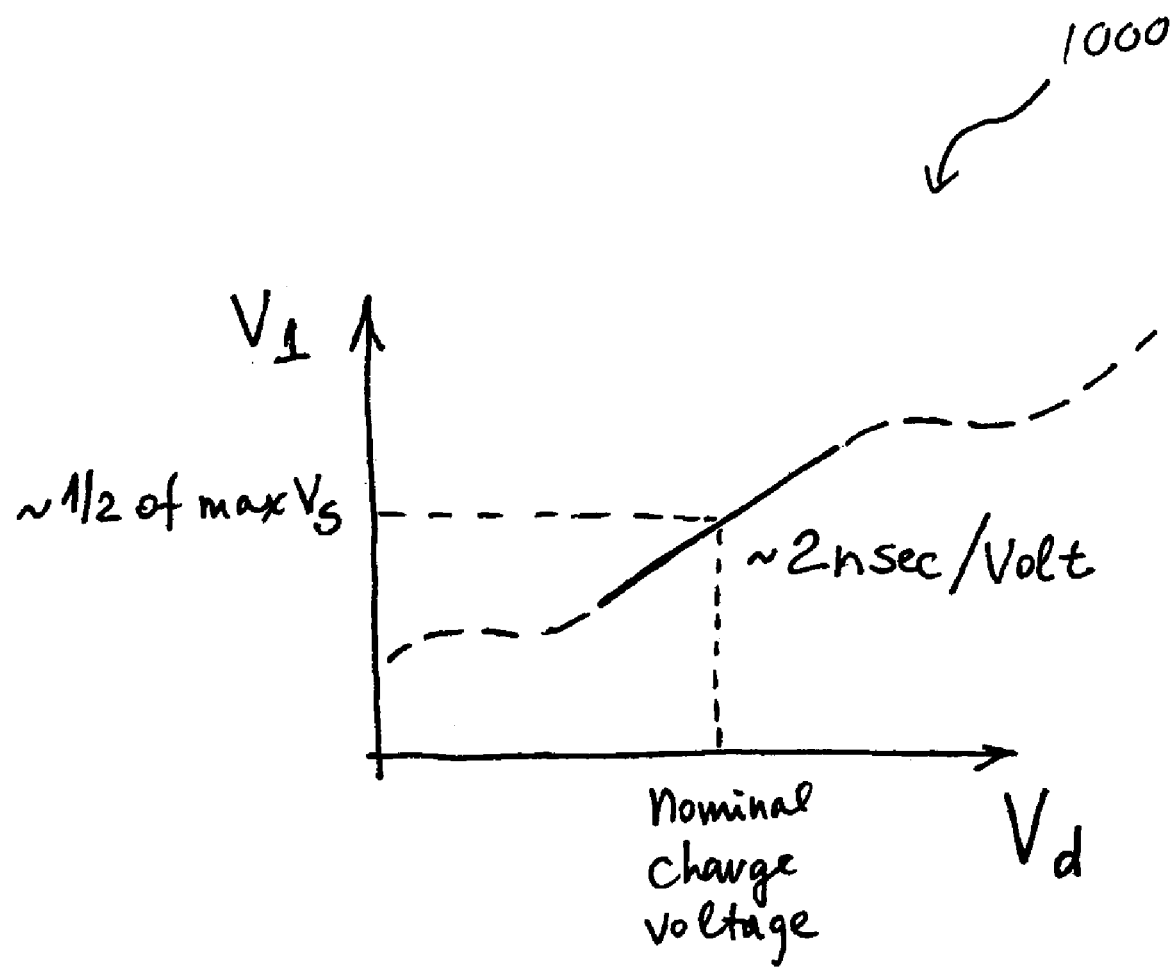
FIG. 10 is a plot for an algorithm that can be used to calculate the control voltage V1 in accordance with one embodiment of the present invention.

FIG. 10 shows a plot 1000 for an algorithm that can be used to calculate a control voltage $V_1$ based on the input voltage $V_d$ from the high voltage divider. The output pulse delay of the magnetic pulse compressor varies depending on the charging voltage with a coefficient of roughly 2 ns/V. The exact dependence is generally non-linear, can be measured experimentally, and can be programmed into an analog circuit that can perform polynomial approximation of this function. Such an analog circuit can be built from several operational amplifiers, or can be based on a programmable analog (PAC) IC. An example of a commercially available PAC is the ispPAC-series of programmable analog ICs from Lattice Semiconductor Corporation of Hillsboro, Oreg. The time response of such an analog circuit can be dependent on the frequency bandwidth of the IC. Such devices typically have a bandwidth of at least 1 MHz, which converts into the response time of better than 1 micro-second.

Various configurations of such a circuit are also possible. For example, the slow control unit can be used to output voltage instead of a trigger pulse. This voltage can be summed with voltages V1 to V4, such that the voltage adds to the total delay. Further, the saw voltage generator can be triggered by a master trigger pulse from a user machine or internal clock. Such a choice can be based on convenience, since generating voltage in a digital system is typically less accurate than generating a delayed pulse.

Figure 11:
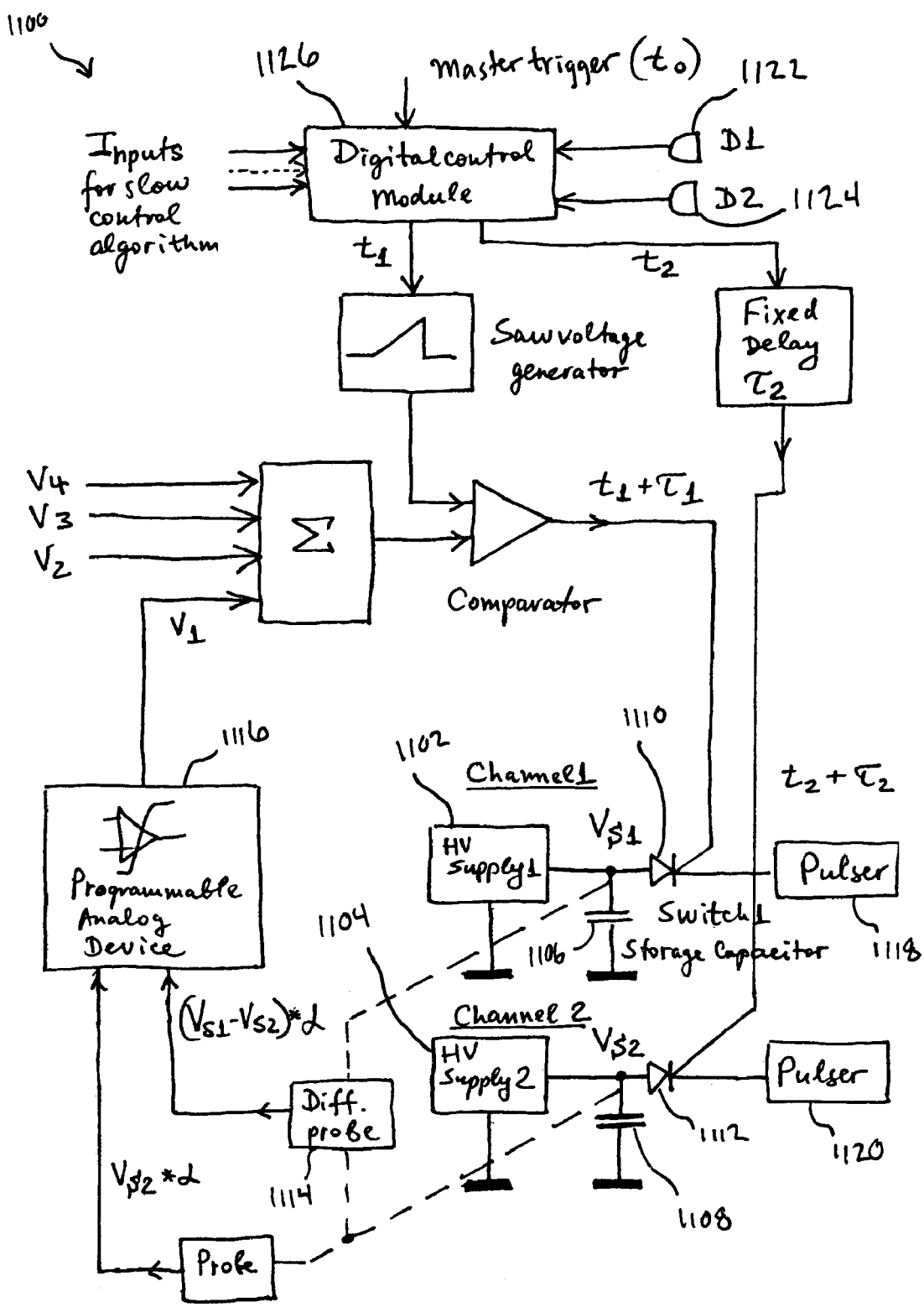
FIG. 11 is a diagram for a multi-channel system in accordance with one embodiment of the present invention.
Figure 12:
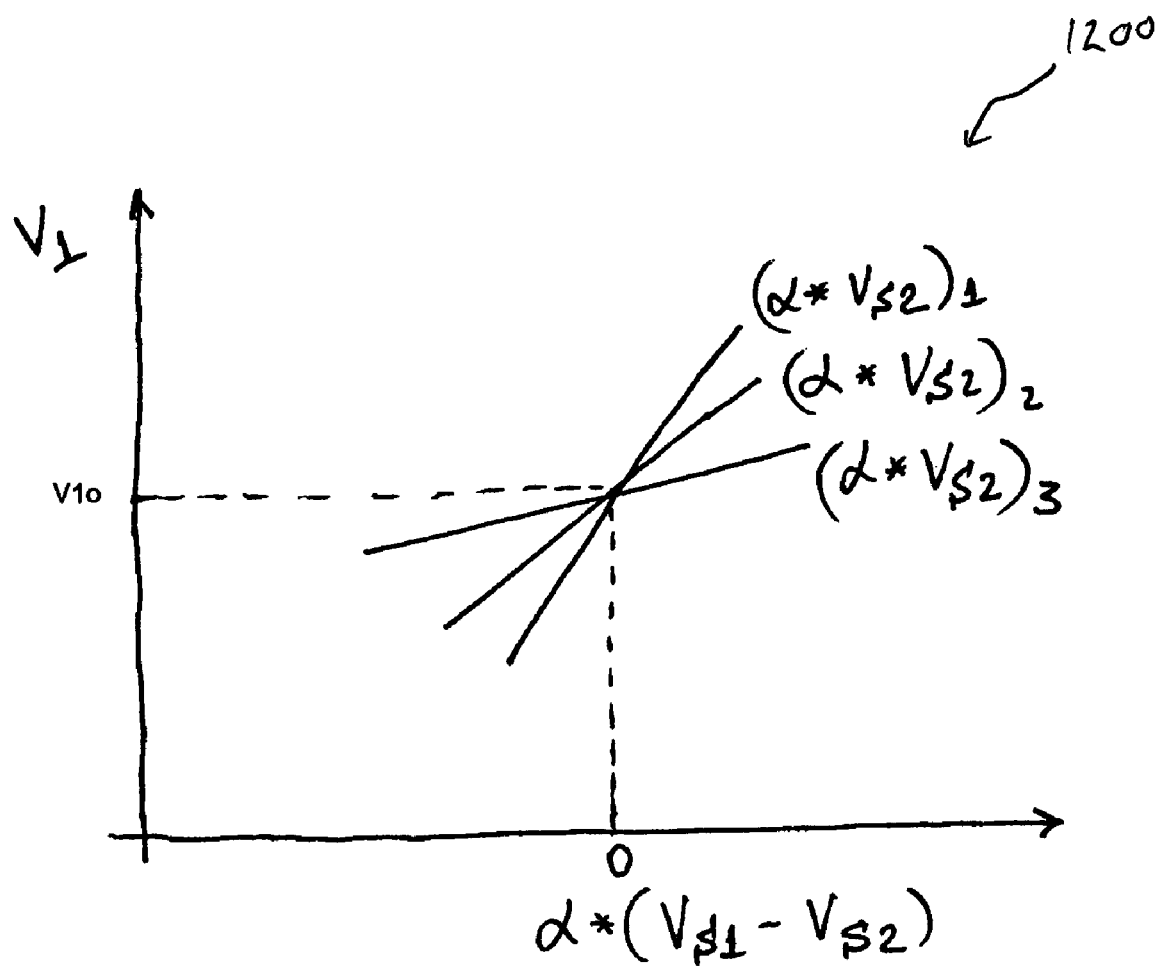
FIG. 12 is a plot showing the parametric dependence of the relative delay in accordance with one embodiment of the present invention.

FIG. 11 shows an embodiment of a real-time compensating circuit 1100 that can be used with a two-channel MOPA system. Each channel can have a high voltage power supply 1102, 1104, a storage capacitor 1106, 1108, and a solid state switch 1110, 1112, followed by the pulse compression circuits of the pulser. The voltages on the storage capacitors are Vs1 and Vs2 for channels 1 and 2, respectively. Since it is the difference in charging voltages that has an effect on the relative delay, it can be more practical to directly measure the difference between Vs1 and Vs2 using a differential high voltage probe 1114, whereby higher resolution can be achieved. The voltage difference can be input to the programmable analog device 1116 with the probe attenuation coefficient a. The programmable analog device can perform an analog computation of the output voltage that is proportional to the required compensating delay between channels 1 and 2. The algorithm can be based on pre-measured dependencies of the delay in each pulser 1118, 1120. Such dependence can be a generally non-linear function, but can be approximated using a linear dependence in the small range where slope changes, depending on the absolute value of the voltage. As the slope can be different in each channel, the dependence of voltage V1 that is necessary to compensate for a relative delay between channels, on the voltage differential between channels, can parametrically depend on the voltage in either channel. This is schematically illustrated in the plot 1200 of FIG. 12, where each branch of parametric dependence is shown as approximately linear, with the slope dependent in this example on the high voltage in channel 2.

The voltage V1 output from the programmable analog device is proportional to the relative delay between the channels that is necessary to compensate for relative jitter caused by the charging voltage fluctuations between pulses. Since the response time of such a device is very short, such as on the order of microsecond or shorter, the algorithm can compensate jitter for each individual pulse.

FIG. 11 also shows that there can be more inputs in the "fast" branch of the control circuit, shown as V2, V3, V4, and so on. These inputs can be based on other parameters, such as an initial magnetization of cores, that vary from pulse to pulse, and that also have a well characterized effect on the overall delay in the pulser. These control voltages can be generated in a similar fashion using a programmable analog device that takes its input voltage from an appropriate sensor.

Instead of using a fast analog algorithm, a slower algorithm, such as a slow digital algorithm, can be used to compensate for slower drifts, such as may be caused by temperature variations. These drifts can occur over many pulses, such that a slow algorithm can utilize the average input and make relatively small adjustments of the delay for each pulse. For such an algorithm, the input can be generated by photodiodes 1122, 1124 for each channel using the actual delay between optical pulses in each channel. This delay information can be averaged over several pulses, and used to increase or decrease the compensating trigger delay between channels. Averaging can effectively decouple a fast algorithm from a slow algorithm, as fast changes average out in a slow algorithm and slow changes are too small, on a per pulse basis, to be felt in the fast algorithm.

FIG. 11 also shows that there can be additional inputs to the slow digital control unit 1126. These inputs can be generally based on any other slow varying parameters that can be measured in absolute terms. For example, one may want to vary the relative timing of the amplified pulse with respect to the amplifier gain pulse, depending on the age of the laser gas. In this case, the number of pulses elapsed since the gas replacement can serve as an input to the slow algorithm.

Figure 13:
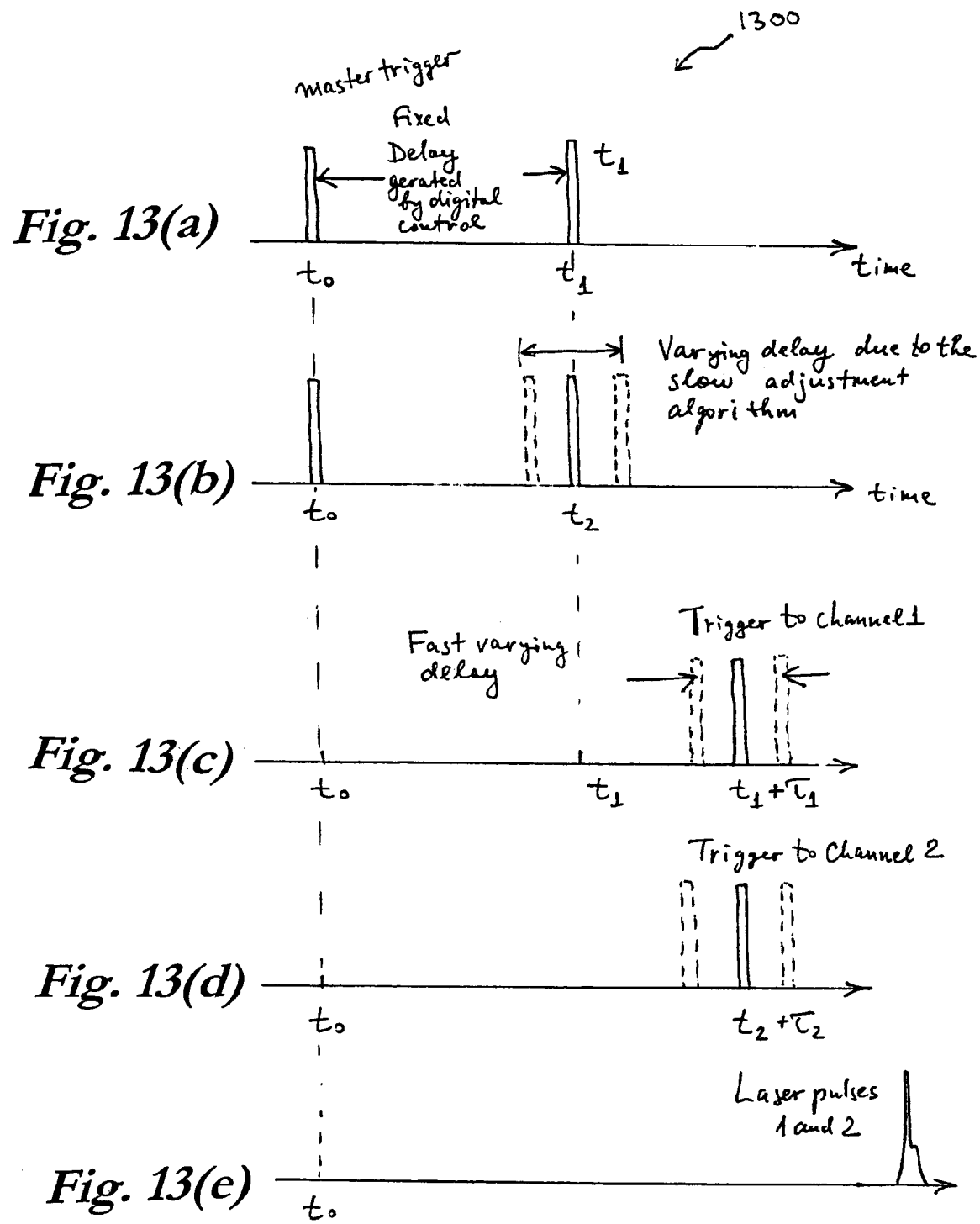
FIGS. 13(a)–(e) is a schematic demonstration of timing in the control circuit in accordance with one embodiment of the present invention.
Figure 14A:
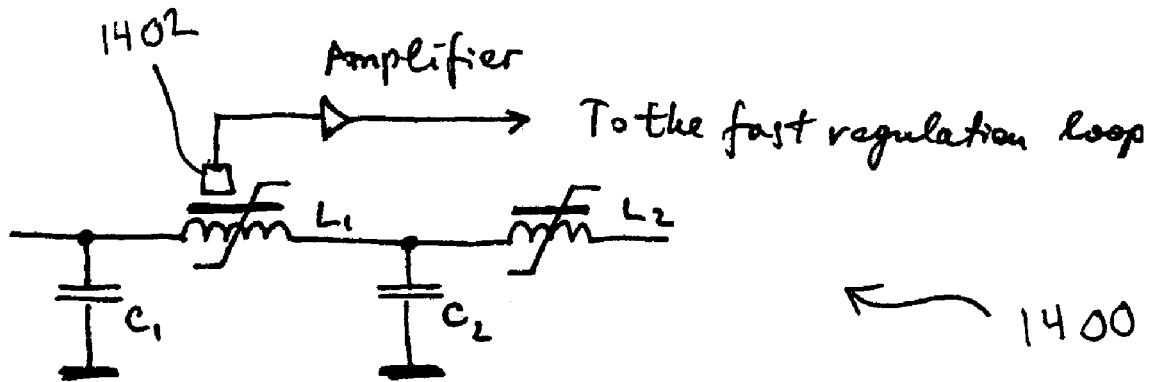
FIGS. 14 (a)–(d) shows the use of a Hall sensor for measuring the magnetic field of the core in accordance with one embodiment of the present invention.
Figure 14B:
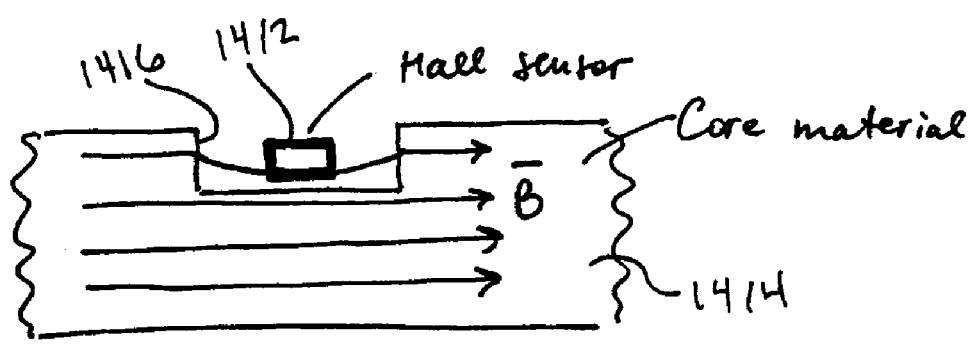
Figure 14C:
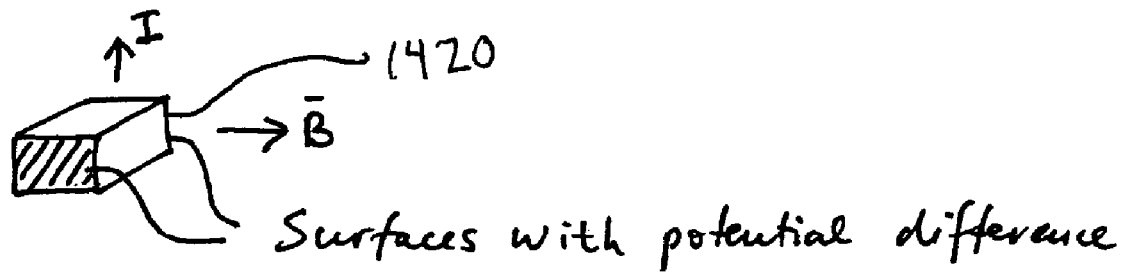
Figure 14D:
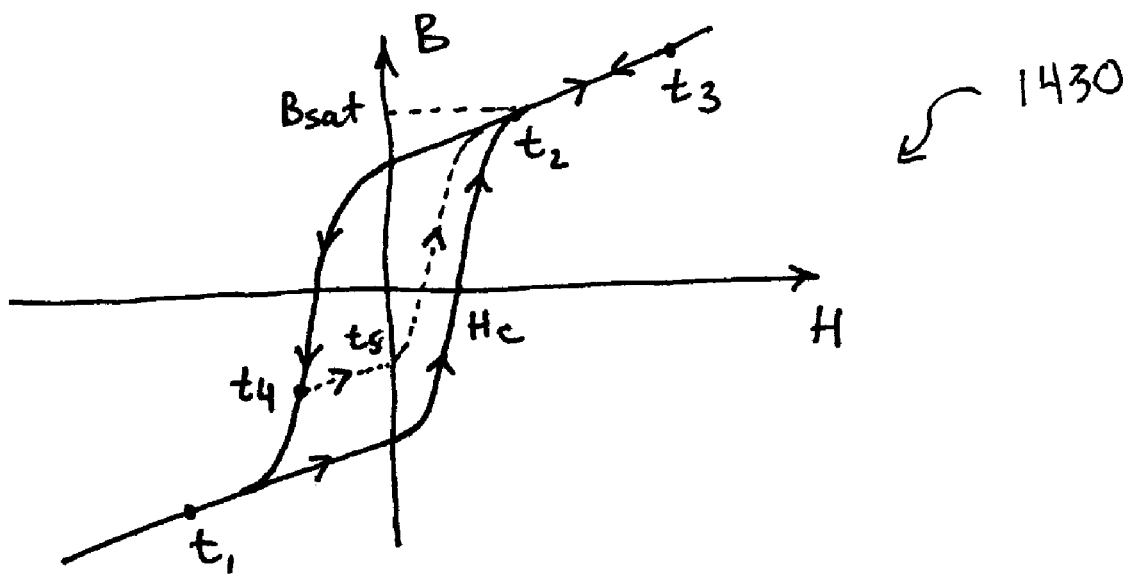

FIG. 13(a)–(e) shows exemlary plots 1300 that schematically illustrate timing in the control circuit. The process can be initiated by a master trigger at $t_0$. The digital control unit can generate a delayed trigger pulse $t_1$ for one of the channels, such as channel 1 in the example of FIG. 13(a). This delay can be necessary in certain embodiments for performing a number of functions in the laser. While some users may require that the master trigger begin charging the storage capacitors, some users may allow the master trigger to occur after the capacitors have been charged. In any case, the delay can be a fixed delay common to both channels. The trigger pulse for the second channel at $t_2$ is delayed with respect to $t_1$ by an amount calculated by the slow algorithm as seen in FIG. 13(b). The relative delay ($t_2-t_1$) can be either positive or negative. The trigger pulse $t_2$ can start another generator of fixed delay $t_2$ (see FIGS. 11 and 13(d)), which may be necessary to compensate for the average value of the fast varying component of the delay in channel 1. Delay generator $t_2$ is shown here as a separate unit only for illustrative purposes, but can be built into the time $t_2$ already in the digital control unit. The trigger pulse $t_1$, on the other hand, can start the saw-voltage generator in order to add fast varying delay $t_1$, as shown in FIG. 13(c). Both delays $t_1$ and $t_2$ are on the order of 10 to 100 nsec. Trigger pulses $t_1+t_1$ and $t_2+t_2$ shown in FIGS. 13(c) and 13(d), respectively, have a relative delay that can be necessary to compensate for the total relative delay in two channels. Finally, a laser pulse can be emitted as shown in FIG. 13(e), with the delay that naturally occurs due to the electrical pulse compression in the pulser and the optical pulse evolution in the resonator.

FIG. 14 shows an example of a sensor for the initial magnetization state of the cores before receiving the pulse. Since there is always some energy in a solid state pulser that is reflected back from the discharge, magnetization can vary between pulses. Varying magnetization can be especially harmful for a burst mode where timing varies between pulses. The total effect of magnetization by reflected current pulses and constant reset current can then vary as well.

FIG. 14 shows a configuration utilizing a Hall sensor for measuring a magnetic field of the core just prior to a discharge pulse. The value of the magnetic field can be converted into voltage and input to the fast feedback loop. FIG. 14(a) shows a schematic diagram 1400 of a portion of a magnetic compressor based on a Melville line, having a Hall sensor, or magnetic field sensor, disposed therein. FIG. 14(b) shows a side view of a Hall sensor configuration 1410, detailing the placement of the sensor 1412 on the core 1414. Since the core has a thoroidal shape, the magnetic field can be contained almost completely inside the core material. The sensor 1412 can be placed advantageously into a small recess 1416 on the surface of the core, in order to allow a small amount of field to leak. FIG. 14(c) is a perspective view of the sensor, showing schematically the direction of magnetic induction vector B and electric current I. The potential difference can be measured between the front and back surfaces of the chip, as seen in the Figure. This potential difference can be proportional to the strength of the magnetic field. An example of a commercially available Hall sensor is Model 3503, a ratiometric linear Hall-effect sensor manufactured by Allegro Microsystems, Inc. of Worcester, Mass. The sensor has a response value of 1.3 mV/Gauss, so the response is 10.4 V at the maximum saturation flux density of a typical core material of 0.8 Tesla. FIG. 14(d) shows a magnetization loop 1430 of the core, as well as the trajectory in B(H) space during the laser operation. In a perfectly "reset" core, the trajectory starts at point $t_1$. Due to the leakage current, the trajectory progresses to a threshold of saturation at $t_2$. The main pulse is then generated, reaching a maximum value of electric current at $t_3$. Following the main pulse, the reset current returns the core to the initial state $t_1$, although in a real-world system some parameter variation can cause the trajectory to return to state $t_4$, instead of intial state $t_1$. With the core in state 4, the magnetization that results in the flux density can be lower than saturated flux density $B_{sat}$. Therefore, when the next pulse arrives, the trajectory can proceed through the state $t_5$ with reduced flux content. This can result in a reduced "hold-off" time for the next compressed pulse. The sensor can detect the value of magnetic flux density B in the initial state, which is dependent on the magnetization, and can provide information to the regulation loop regarding the flux content of the core.

Figure 15A:
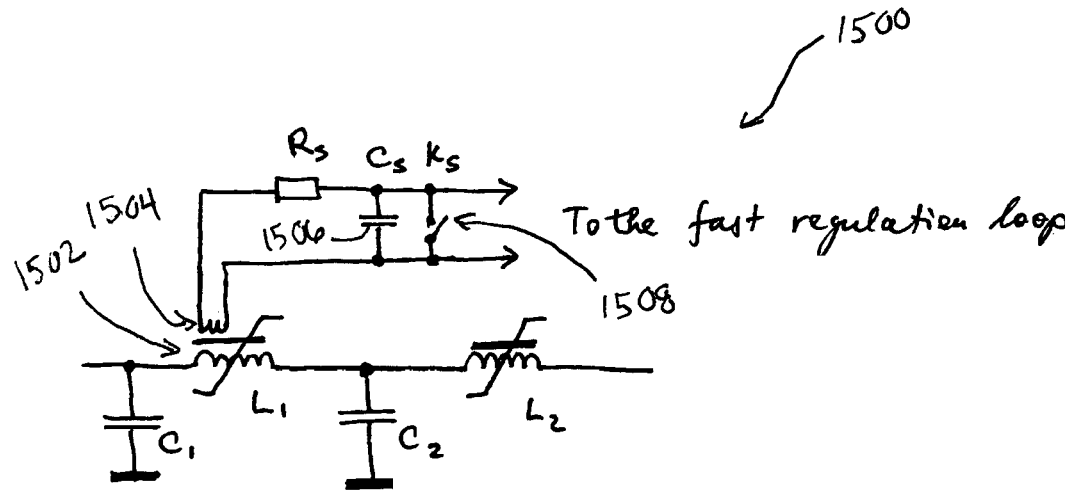
FIGS. 15 (a)–(b) shows a diagram of a voltage integrator and a corresponding pulsediagram in accordance with one embodiment of the present invention.
Figure 15B:
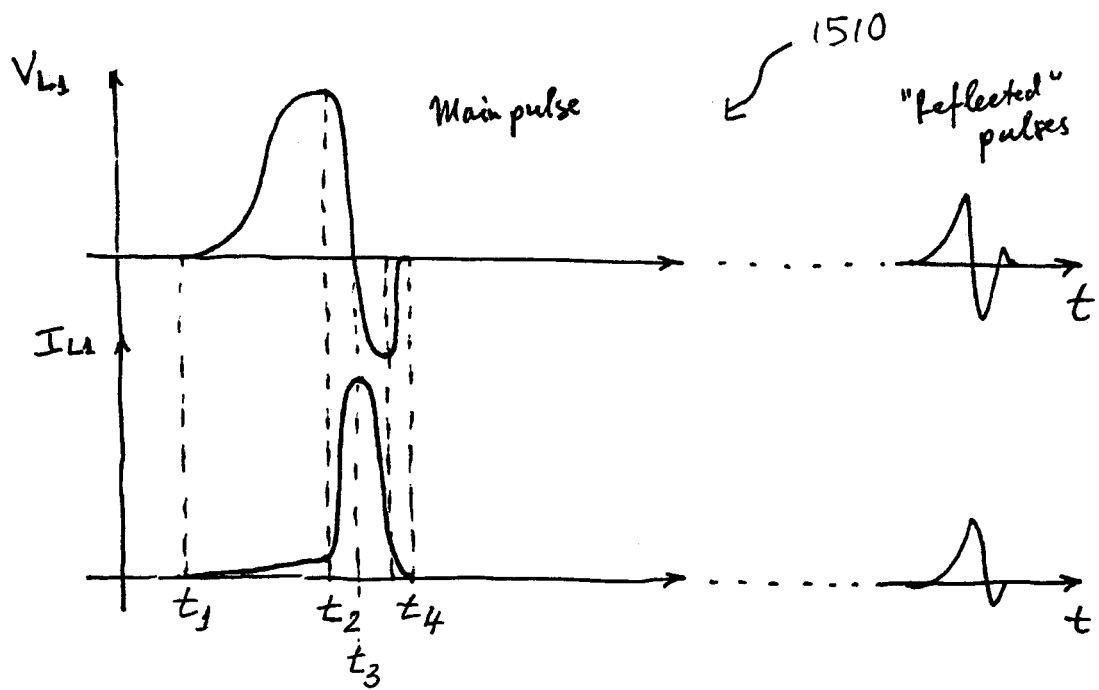

FIG. 15 shows schematically another circuit 1500 based on a voltage integrator, which can be used in accordance with another embodiment of the present invention. A saturable inductor 1502 can be used, which has an additional, relatively small winding 1504. The voltage generated in this additional winding can follow the waveform of the voltage drop on the main winding, and the voltage, Vs, can be proportional to the voltage drop on the main winding. The time integral of this voltage can serve as a measure of change in magnetization state of the core, as discussed herein. Integration can be done by means of capacitor Cs 1506, where the time constant $R_s C_s$ is greater than the time between pulses. The integrator can be reset before each pulse by switch $K_s$ 1508. At the end of the integration cycle, the voltage output of capacitor Cs 1506 is a measure of magnetization increment that occurred between the pulses. FIG. 15(b) shows a plot 1510 illustrating that the integration occurs over the main pulse, as well as over possible reflected pulses expected to arrive within several microseconds after the main pulse. The reset current also can contribute to this value. The generated voltage can be sampled at the end of the integration cycle, and can serve as an additional input to the fast regulation loop.

Common Cooling

Figure 16:
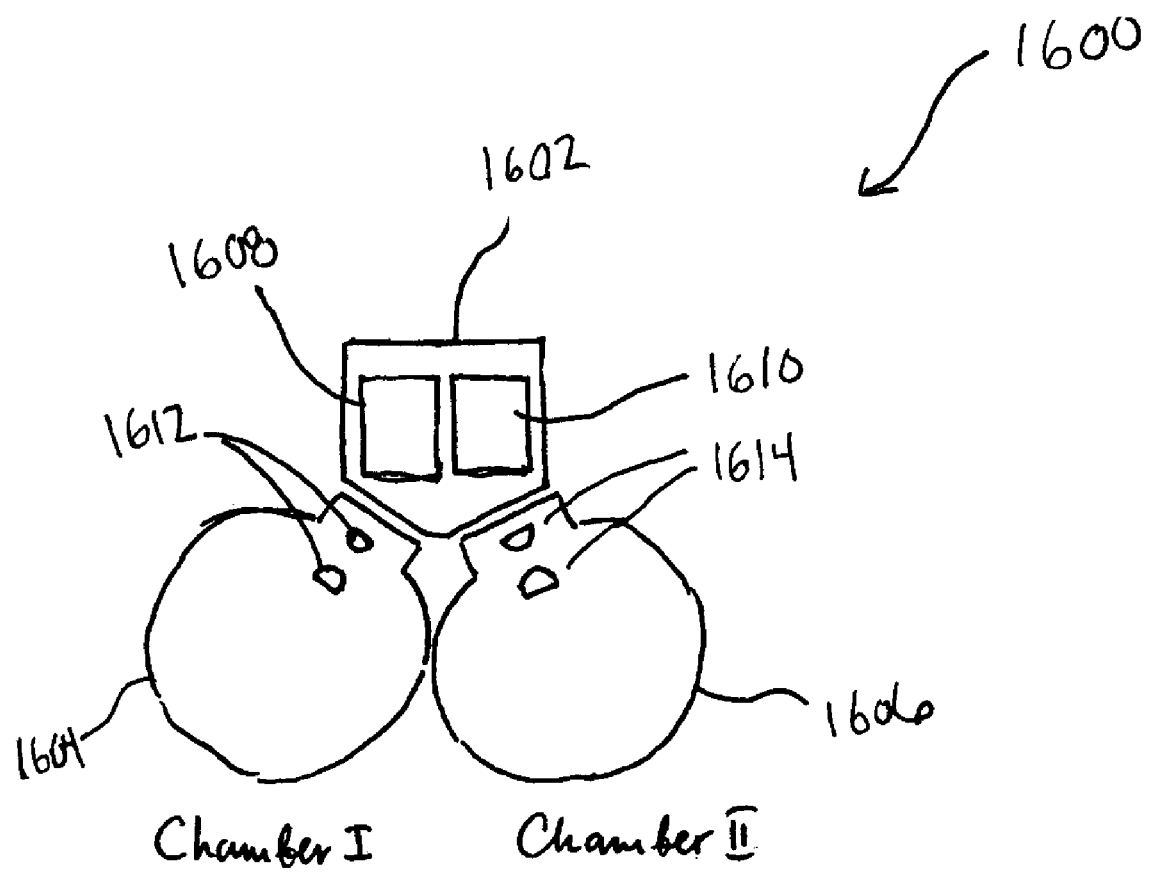
FIG. 16 is a diagram of a system using a common cooling system with two chambers in accordance with one embodiment of the present invention.

FIG. 16 shows a diagram of a laser system 1600 that can be used in accordance with another embodiment. This system utilizes first and second pursers 1608, 1610 to drive first and second chambers 1604, 1606 using a common cooling system 1602, such as a common oil bath, for equalizing the temperatures of the channels corresponding to the chambers. The chambers 1604, 1606 can be tilted relative to the common cooler arrangement, in order to reduce the spacing between the sets of electrodes 1614 for the chambers 1604, 1606. The spacing reduction can help to minimize the inductance of lead components. In a variation of this configuration, a common pulser can be used, which in one embodiment can have two separate final compressor stages.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. An excimer or molecular fluorine laser system, comprising:

first and second discharge chambers each being filled with a gas mixture, each of said first and second discharge chambers containing a pair of electrodes for energizing the gas mixture and outputting an optical pulse;

circuitry for providing separate, sequential excitation pulses to said first and second discharge chambers; and a real time jitter compensation circuit, said jitter compensation circuit receiving an input corresponding to a measured laser parameter which exhibits pulse to pulse variations, said jitter compensation circuit generating a variable delay signal in response to the received input and supplying the signal to said circuitry to control the relative timing of the excitation pulses delivered to the first and second discharge chambers on a real time pulse to pulse basis, and wherein said laser parameter is selected from one or more of the voltage on a storage capacitor, a reset current and a core magnetization.

2. A laser system as recited in claim 1, wherein the voltage on the storage capacitor is measured with a differential high voltage probe.

3. A laser system as recited in claim 1, wherein said jitter compensation circuit includes a fast analog circuit.

4. A laser system as recited in claim 1, wherein the circuitry includes a separate pulser for each discharge chamber.

5. A laser system as recited in claim 1, wherein the circuitry includes a common pulser system and the compensation circuit compensates for jitter between channels of the common pulser.

6. A laser system as recited in claim 1, further including a feedback loop to compensate for jitter caused by slower, non-pulse to pulse changes.

7. A laser system as recited in claim 6, wherein said feedback loop monitors the delay between the excitation of the two discharges and generates a signal in response thereto that is supplied to the compensation circuit and is used in generating the variable delay signal.

8. A laser system as recited in claim 1, wherein the first discharge chamber functions as an oscillator and the second discharge chamber functions as an amplifier to amplifier the optical pulses generated by the first discharge chamber.

9. An excimer or molecular fluorine laser system, comprising:

a master oscillator including a discharge chamber filled with a gas mixture and containing a pair of electrodes for energizing the gas mixture and outputting an optical pulse;

a power amplifier including a discharge chamber filled with a gas mixture and containing a pair of electrodes for energizing the gas mixture for amplifying the optical pulses generated by the oscillator;

circuitry for providing separate, sequential excitation pulses to said oscillator and amplifier; and a real time jitter compensation circuit, said jitter compensation circuit receiving first inputs corresponding to a measured laser parameter which exhibits pulse to pulse variations and second inputs corresponding to slower, non-pulse to pulse variations, said jitter compensation circuit generating a variable delay signal in response to said received first and second inputs and supplying the signal to said circuitry on a real time basis to control the relative timing of the excitation pulses delivered to the oscillator and the amplifier.

10. A laser system as recited in claim 9, wherein said laser parameter is selected from one or more of the voltage on a storage capacitor, a reset current and a core magnetization.

11. A laser system as recited in claim 9, wherein the circuitry includes a separate pulser for the oscillator and the amplifier.

12. A laser system as recited in claim 9, wherein the circuitry includes a common pulser system and the compensation circuit compensates for jitter between channels of the common pulser.

13. A laser system as recited in claim 6, wherein said compensation circuit monitors the delay between the excitation of the oscillator and the amplifier and is used to generate said second inputs.

* * * * *